United States Patent
Naka et al.

(10) Patent No.: US 8,559,047 B2
(45) Date of Patent: Oct. 15, 2013

(54) INFORMATION PROCESSING APPARATUS, INFORMATION PROCESSING APPARATUS CONTROL METHOD, AND STORAGE MEDIUM

(75) Inventors: Akiteru Naka, Machida (JP); Naohiro Isobe, Kawasaki (JP); Yutaka Myoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 12/986,944

(22) Filed: Jan. 7, 2011

(65) Prior Publication Data

US 2011/0170140 A1 Jul. 14, 2011

(30) Foreign Application Priority Data

Jan. 14, 2010 (JP) .................................. 2010-005834

(51) Int. Cl.
*G06F 15/00* (2006.01)
(52) U.S. Cl.
USPC ........................................................ 358/1.16
(58) Field of Classification Search
USPC ........................................................ 358/1.16
See application file for complete search history.

(56) References Cited

U.S. PATENT DOCUMENTS

| 6,526,215 B2 | 2/2003 | Hirai et al. |
| 2008/0297834 A1 | 12/2008 | Yamaguchi |
| 2010/0195140 A1* | 8/2010 | Shepherd et al. ............ 358/1.15 |

FOREIGN PATENT DOCUMENTS

| CN | 1677395 A | 10/2005 |
| CN | 101067814 A | 11/2007 |
| EP | 1837752 A2 | 9/2007 |
| JP | 11-205736 A | 7/1999 |

* cited by examiner

*Primary Examiner* — Saeid Ebrahimi Dehkordy
(74) *Attorney, Agent, or Firm* — Canon USA Inc IP Division

(57) ABSTRACT

An information processing apparatus includes an automatic update determination unit that stores update information for updating a record level among layers included in print data, a layered metadata change unit that acquires a key included in metadata in the print data and a value corresponding to the key, generates a change screen that can receive an instruction relating to grouping processing of the metadata, performs grouping processing on the metadata based on the instruction relating to grouping processing received via the change screen, determines based on the update information whether the record level needs to be changed by the grouping processing, and changes the record level when it is determined that the record level needs to be changed.

11 Claims, 24 Drawing Sheets

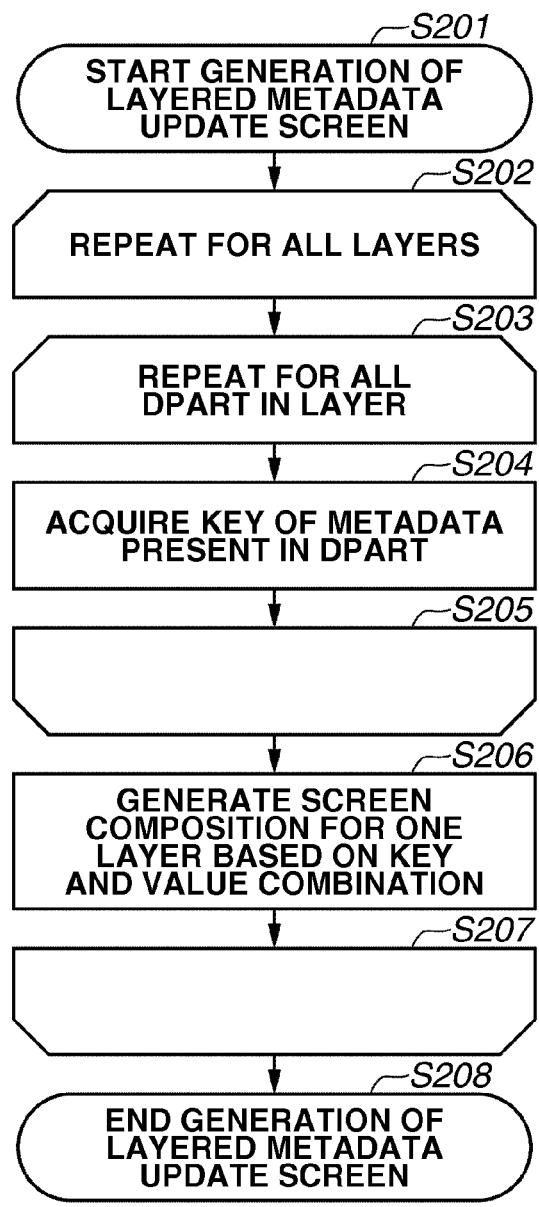

FIG.9A

| KEY | NAME | PREFECTURE | CITY | GENDER | AGE |
|---|---|---|---|---|---|
| VALUE | ICHIRO SUZUKI | TOKYO | OTA | MALE | 30 |
| | SABURO TANAKA | KANAGAWA | KAWASAKI | MALE | 40 |
| | TARO YAMADA | TOKYO | OTA | MALE | 50 |
| | JIRO SATO | KANAGAWA | YOKOHAMA | MALE | 20 |

FIG.9B

| KEY | PREFECTURE | NAME | CITY | GENDER | AGE |
|---|---|---|---|---|---|
| VALUE | TOKYO | ICHIRO SUZUKI | OTA | MALE | 30 |
| | | TARO YAMADA | OTA | MALE | 50 |
| | KANAGAWA | SABURO TANAKA | KAWASAKI | MALE | 40 |
| | | JIRO SATO | YOKOHAMA | MALE | 20 |

FIG.9C

| KEY | PREFECTURE (723) | CITY (724) | NAME | GENDER | AGE (722) |
|---|---|---|---|---|---|
| VALUE | TOKYO | OTA | ICHIRO SUZUKI | MALE | 30 |
| | | | TARO YAMADA | MALE | 50 |
| | KANAGAWA | KAWASAKI | SABURO TANAKA | MALE | 40 |
| | | YOKOHAMA | JIRO SATO | MALE | 20 |

| KEY | PREFECTURE (725) | CITY (727) | NAME | GENDER | AGE (726) |
|---|---|---|---|---|---|
| VALUE | TOKYO | OTA | ICHIRO SUZUKI | MALE | 30 |
| | | | TARO YAMADA | MALE | 50 |
| | KANAGAWA | KAWASAKI | SABURO TANAKA | MALE | 40 |
| | KANAGAWA | YOKOHAMA | JIRO SATO | MALE | 20 |

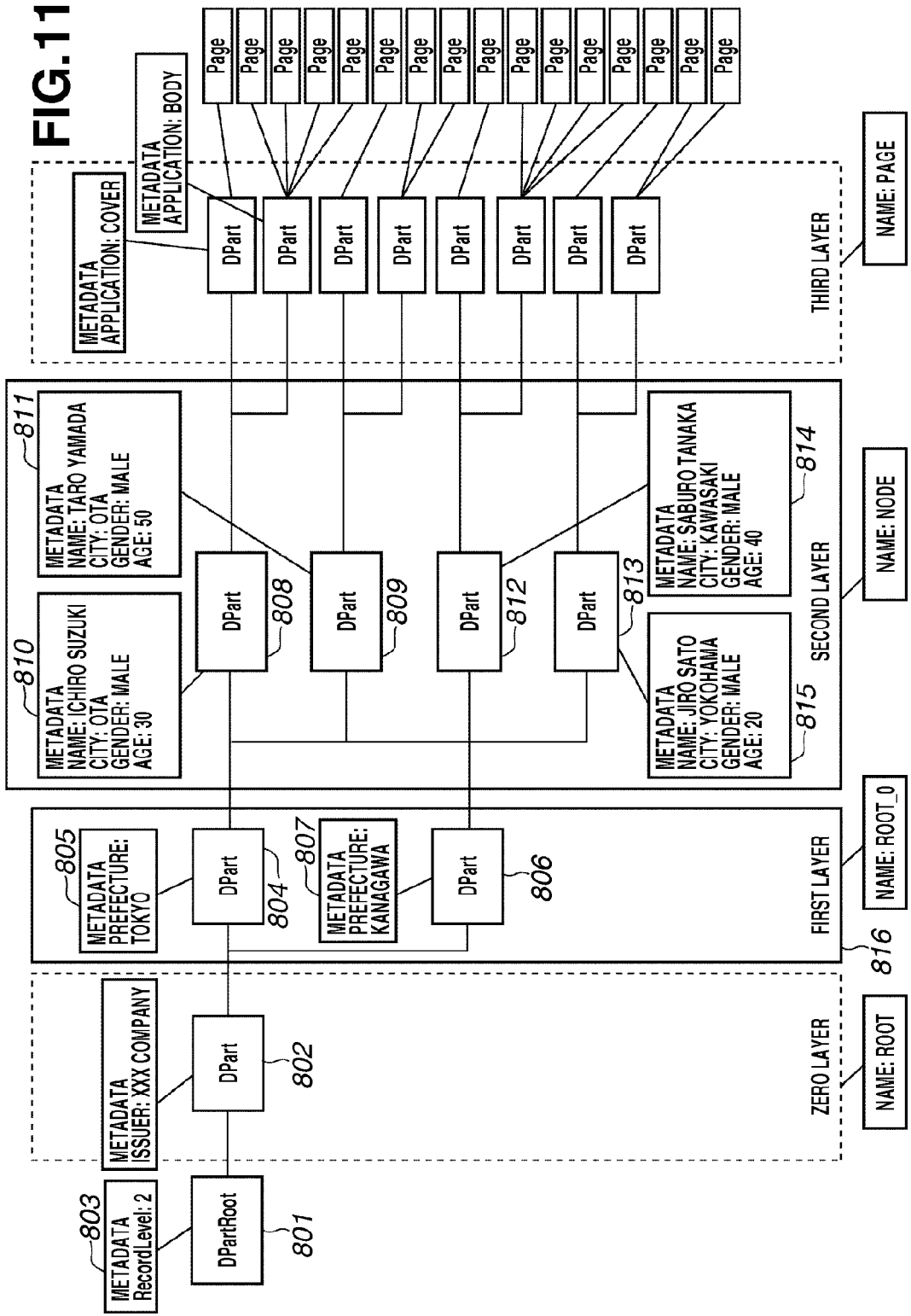

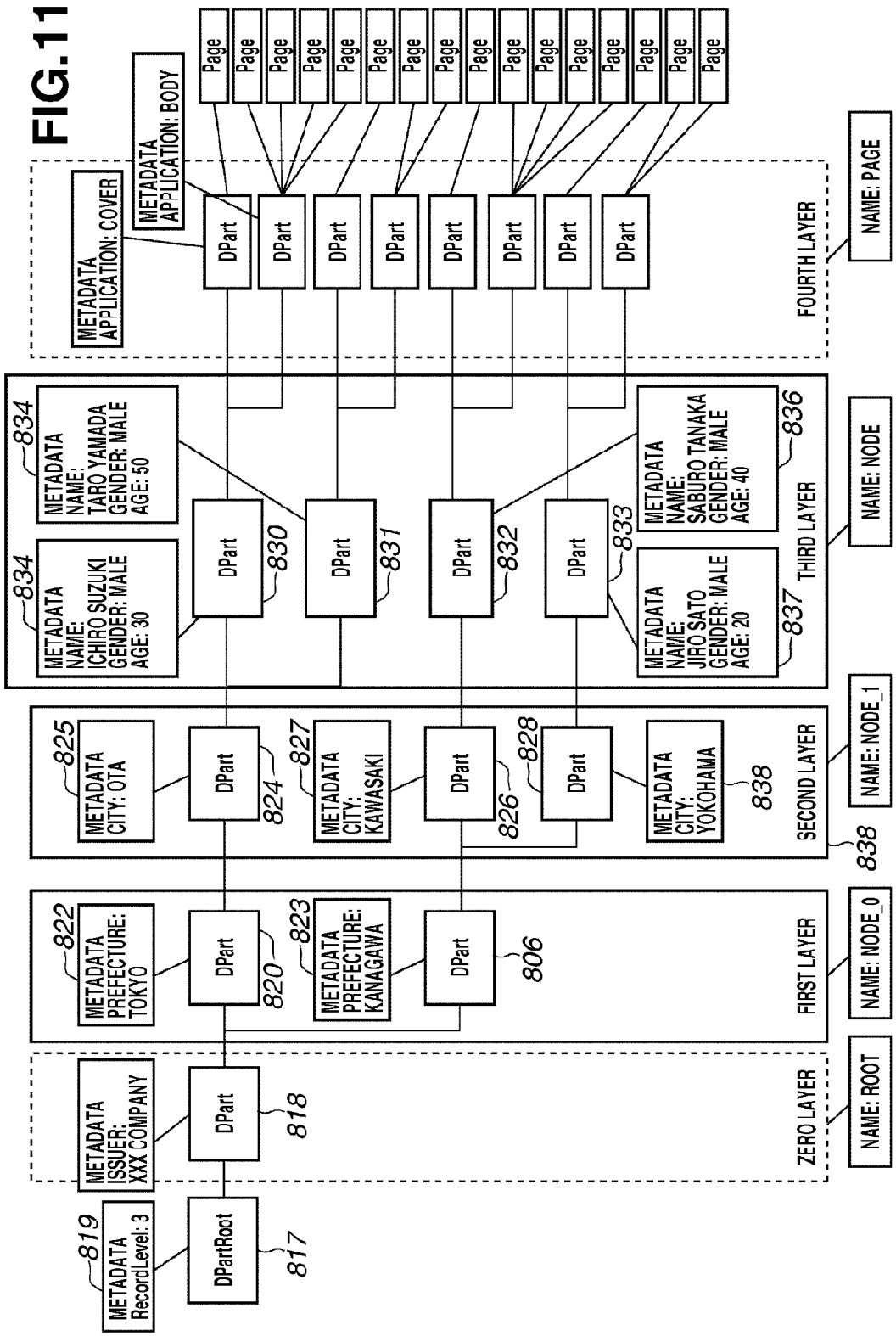

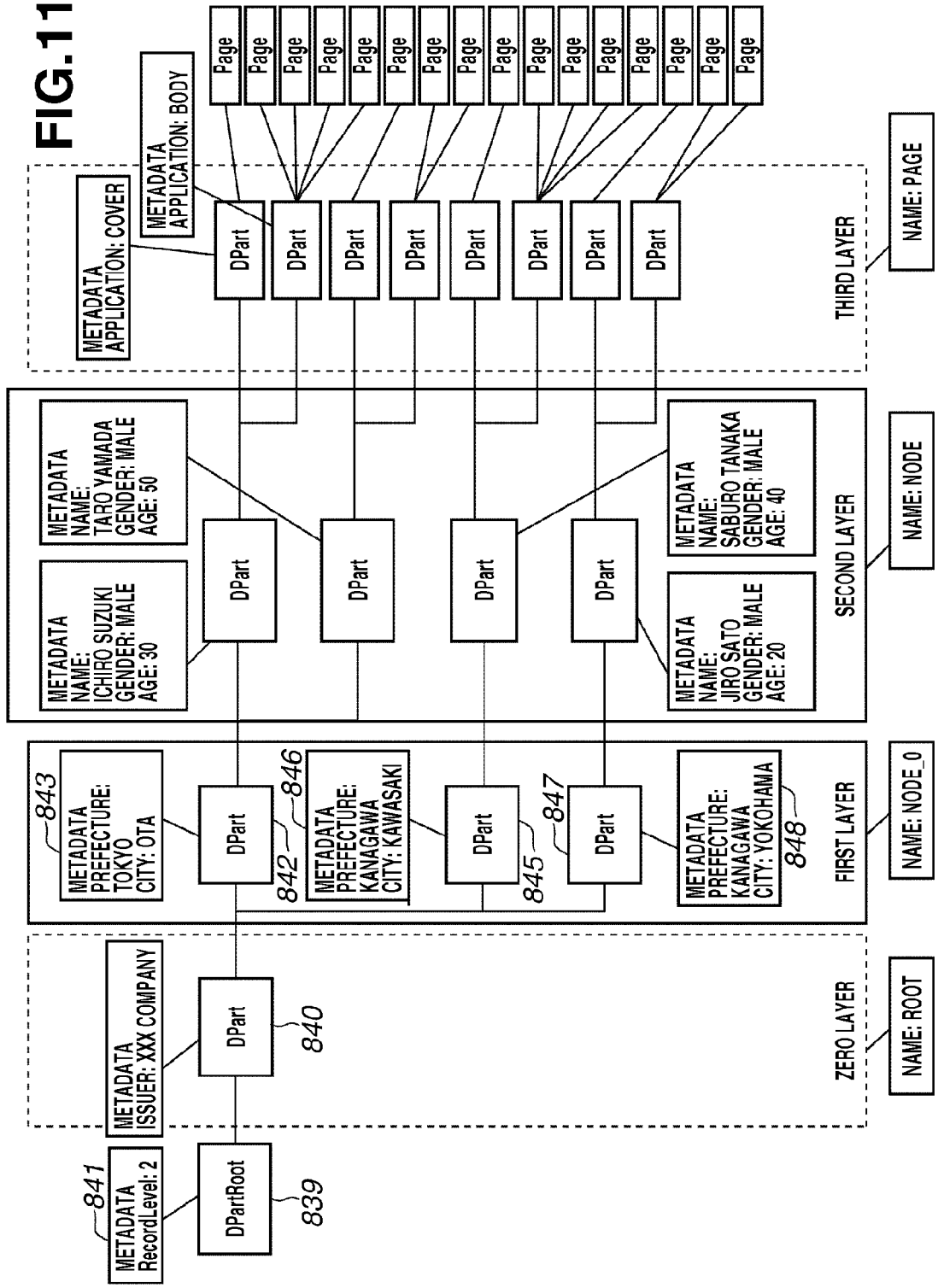

FIG.14

```
┌─────────────────────────────────────────┐
│    │ AUTOMATIC DETERMINATION SCREEN │   │
│                                         │
│ 1001 ─ ☐ PREFECTURE   ☑ FIXED           │
│ 1002 ─ ☐ CITY           1006            │
│ 1003 ─ ☑ NAME                           │
│ 1004 ─ ☐ GENDER                         │
│ 1005 ─ ☐ AGE                            │
│                                         │
└─────────────────────────────────────────┘
```

FIG.16

| | 1101 | 1102 | 1103 | 1104 | 1105 |
|---|---|---|---|---|---|
| KEY | PREFECTURE | NAME | CITY | GENDER | AGE |
| VALUE | TOKYO | ICHIRO SUZUKI | OTA | MALE | 30 |
| | | TARO YAMADA | OTA | MALE | 50 |
| | KANAGAWA | SABURO TANAKA | KAWASAKI | MALE | 40 |
| | | JIRO SATO | YOKOHAMA | MALE | 20 |

FIG.18

| | AUTOMATIC DETERMINATION SCREEN |
|---|---|
| 1201 — ☐ PREFECTURE | ☑ DELETE UNNECESSARY METADATA |
| 1202 — ☐ CITY | 1206 |
| 1203 — ☑ NAME | |
| 1204 — ☐ GENDER | |
| 1205 — ☐ AGE | |

FIG.19A

| | 1303 1311 1304 1305 1312 1306 1307 1308 1309 1313 1310 | | | |
|---|---|---|---|---|
| KEY | NAME | ADDRESS | GENDER | AGE |
| VALUE | ICHIRO SUZUKI | 1-2-1 OTA CITY, TOKYO | MALE | 30 |
| | SABURO TANAKA | 2-3-4 KAWASAKI CITY, KANAGAWA | MALE | 40 |
| | TARO YAMADA | 5-31 OTA CITY, TOKYO | MALE | 50 |
| | JIRO SATO | 3-1 YOKOHAMA CITY, KANAGAWA | MALE | 20 |

1301 — KEY row
1302 — VALUE row

FIG.19B

| NEW KEY DEFINITION "ADDRESS" 1314 | | | |
|---|---|---|---|
| KEY | PREFECTURE | RULE | XXXX |
| KEY | CITY | RULE | YYY |
| KEY | DETAILED ADDRESS | RULE | ZZZ |
| KEY | | RULE | |
| KEY | | RULE | |
| OK | | CANCEL | |

1315 — left column
1316 — right column

FIG.19C

|  |  | 1318 1317 |  |  |
|---|---|---|---|---|
| KEY | ◀ [ ↵ ] ▶ NAME | ◀ [PREFECTURE ↵] ▶ ADDRESS | ◀ ▶ GENDER | ◀ [ ↵ ] ▶ AGE |
| VALUE | ICHIRO SUZUKI | 1-2-1 OTA CITY, TOKYO | MALE | 30 |
|  | SABURO TANAKA | 2-3-4 KAWASAKI CITY, KANAGAWA | MALE | 40 |
|  | TARO YAMADA | 5-31 OTA CITY, TOKYO | MALE | 50 |
|  | JIRO SATO | 3-1 YOKOHAMA CITY, KANAGAWA | MALE | 20 |

FIG.19D

| KEY | ◀ ▶ PREFECTURE | ◀ [ ↵ ] ▶ NAME | ◀ [ ↵ ] ▶ ADDRESS | ◀ ▶ GENDER | ◀ [ ↵ ] ▶ AGE |
|---|---|---|---|---|---|
| VALUE | TOKYO | ICHIRO SUZUKI | 1-2-1 OTA CITY | MALE | 30 |
|  |  | TARO YAMADA | 5-31 OTA CITY | MALE | 50 |
|  | KANAGAWA | SABURO TANAKA | 2-3-4 KAWASAKI CITY | MALE | 40 |
|  |  | JIRO SATO | 3-1 YOKOHAMA CITY | MALE | 20 |

1319

INFORMATION PROCESSING APPARATUS, INFORMATION PROCESSING APPARATUS CONTROL METHOD, AND STORAGE MEDIUM

BACKGROUND OF THE INVENTION

1. Field of the Invention

The present invention relates to an information processing apparatus for editing page description language (PDL) data expressed in a hierarchical structure, an information processing apparatus control method, and a storage medium.

2. Description of the Related Art

<POD, Variable Printing and PDF/VT>

With the spread of printing systems aimed at the print-on-demand (POD) market, variable printing, in which a printed product customized for each customer is printed, has been gaining attention. Variable printing has the advantage that a printed product suited to the customer can be produced, because printing can be performed by reading a database and changing the contents of each and every page for each customer.

Against this background, the standardization process of ISO 16612-2 portable document format/variable data and transactional (PDF/VT) has been progressing as a language specification for variable printing. A characteristic of PDF/VT is that it can be used even for existing PDF work flows by adding a specification for variable printing or transaction printing with PDF as a base.

<PDF/VT Characteristics (Hierarchical Structure: DPart and Metadata: DPM)>

PDF/VT can build a PDF page by adding hierarchical structure layers called document parts (DParts). Further, arbitrary metadata called document part metadata (DPM) may be added to each DPart. A wide variety of information, such as "postcode", "address", and "name", can be added to the metadata expressed in a hierarchical structure (layered metadata) based on a relationship between a key and a value.

Further, PDF/VT has a root node relating to the hierarchical structure, called a document part root ("DPartRoot"). In addition, the metadata in the DPartRoot is stored as layered metadata based on a relationship between a key and a value concerning record information obtained when the database is read. This hierarchical information is managed by a "record level" key.

Further, the PDF/VT layered metadata can be freely edited by adding or deleting DParts to/from the hierarchical structure. Consequently, the layers can be used for the purpose of grouping by adding metadata to the layers so that the layers have a meaning.

<How PDF/VT is Used to Realize Variable Printing>

A job definition format (JDF) is used along with PDL data, such as PDF/VT, to control the whole printing workflow. When performing variable printing using JDF and PDF/VT, customer information is acquired by referring to the PDF/VT metadata, and customized for each customer for printing. Further, an engine for reading the JDF and performing imposition processing, performs imposition processing while repeatedly referring to the record level layers of the PDF/VT.

By using PDF/VT together with printing control information such as JDF, PDF/VT enables printing control in which only a page matching a specific postcode is printed based on layered metadata. More specifically, PDF/VT enables control in which only a specific group, namely, a specific postcode, is printed using printing control information such as JDF.

Thus, since PDF/VT includes layered metadata, which can be grouped by freely editing the layers, PDF/VT can realize detailed printing control.

Japanese Patent Application Laid-Open No. 11-205736 discusses a method for graphically editing a hierarchical structure and metadata accompanying the hierarchical structure.

Even when a PDF/VT hierarchical structure is changed by editing the PDF/VT to perform grouping, obviously the "record level" key needs to be correctly managed. Further, to perform printing control, not only is it necessary to correctly manage the "record level" of the PDF/VT itself, but the references in the JDF also need to be correctly stored. Consequently, there is a need for metadata editing that is realized in a hierarchical structure by a simple method, without destroying the reference relationship.

However, Japanese Patent Application Laid-Open No. 11-205736 does not consider points such as grouping by using the layered metadata, or storing the number of layers required for printing control for the hierarchical information that can be changed by grouping. Consequently, there is a problem that the record level may be set to a layer not intended by the user due to metadata editing.

SUMMARY OF THE INVENTION

According to an aspect of the present invention, an information processing apparatus for processing print data having a hierarchical structure, in which metadata can be added to layers in the hierarchical structure, includes a storage unit configured to store update information for updating a record level, which is a layer to be repeatedly processed among the layers included in the print data, a first acquisition unit configured to acquire a key included in metadata in the print data and a value corresponding to the key, a change screen generation unit configured to generate a change screen that can receive an instruction relating to grouping processing of the metadata using the key and the value acquired by the first acquisition unit, a processing unit configured to perform grouping processing on the metadata based on the instruction relating to grouping processing received via the change screen, a determination unit configured to determine based on the update information whether the record level needs to be changed by the grouping processing performed by the processing unit, and a change unit configured to change the record level based on the update information when it is determined by the determination unit that the record level needs to be changed.

According to the present invention, the number of layers required for printing control can be stored, and the setting of the record level to a layer not intended by the user due to metadata editing can be prevented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flowchart relating to generation of a layered metadata change screen.

FIGS. 9A to 9D are image diagrams respectively illustrating an example of a layered metadata change screen.

FIGS. 11A to 11C are image diagrams respectively illustrating an example of layered metadata.

FIG. 14 illustrates an example of an automatic update determination screen.

FIG. 16 illustrates an example of a metadata change screen.

FIG. 18 illustrates an example of an automatic update determination screen.

FIGS. 19A, 19C, and 19D respectively illustrate an example of a layered metadata change screen, and FIG. 19B illustrates an example of a new key definition screen.

DESCRIPTION OF THE EMBODIMENTS

Various exemplary embodiments, features, and aspects of the invention will be described in detail below with reference to the drawings.

Figure 1:
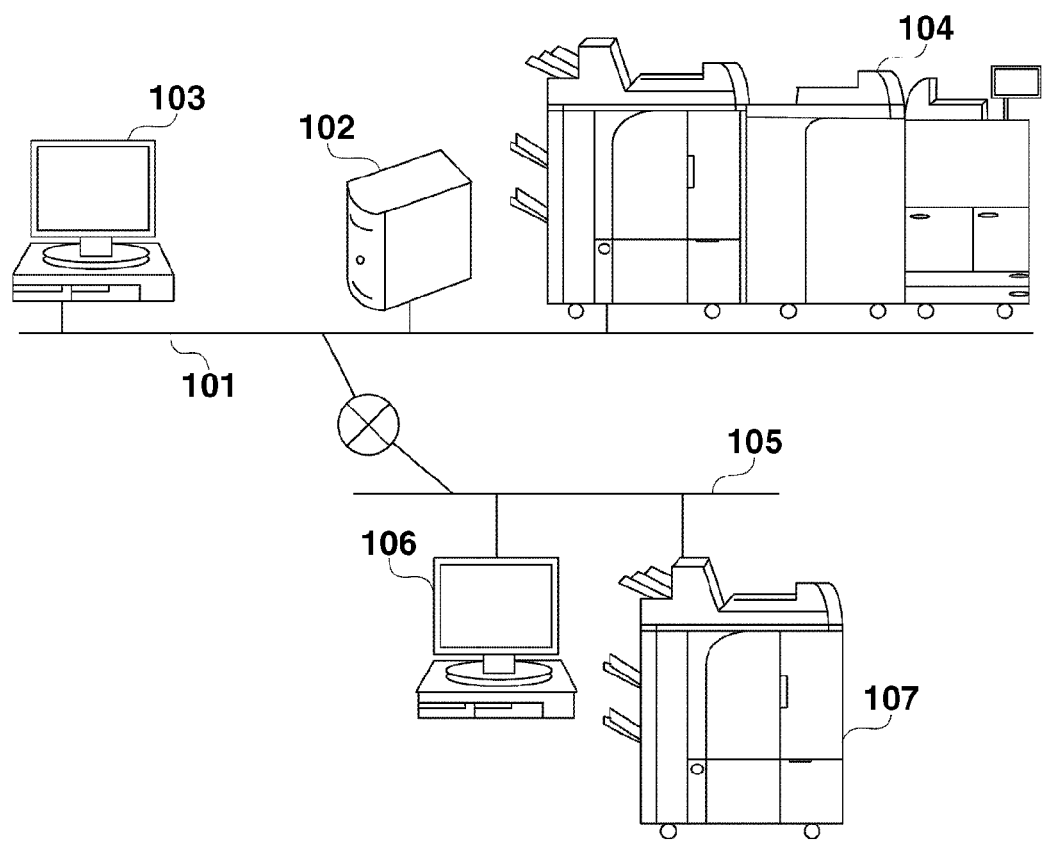
FIG. 1 is a configuration diagram of a POD system.

FIG. 1 is a schematic diagram illustrating the configuration of a POD system which includes a printing system according to an exemplary embodiment of the present invention.

This POD system includes a server computer 102, a client computer 103, and a printing apparatus 104. These units are connected with each other via a network 101.

The server computer 102 manages the sending and receiving of data with the various apparatuses connected to the network 101. The client computer 103 can edit a print document, and sends a print document to the printing apparatus 104 and the server computer 102 via the network 101. When the printing apparatus 104 receives a print document, the printing apparatus 104 communicates as necessary with the server computer 102, and starts printing.

Further, the print document produced by the client computer 103 can also be sent via the network 101 to another client computer 106 managed by a network environment 105 different to the server computer 102. Further, after the print document is edited by the client computer 106, the image data can be printed by a printing apparatus 107 which is also in a different environment.

Figure 2:
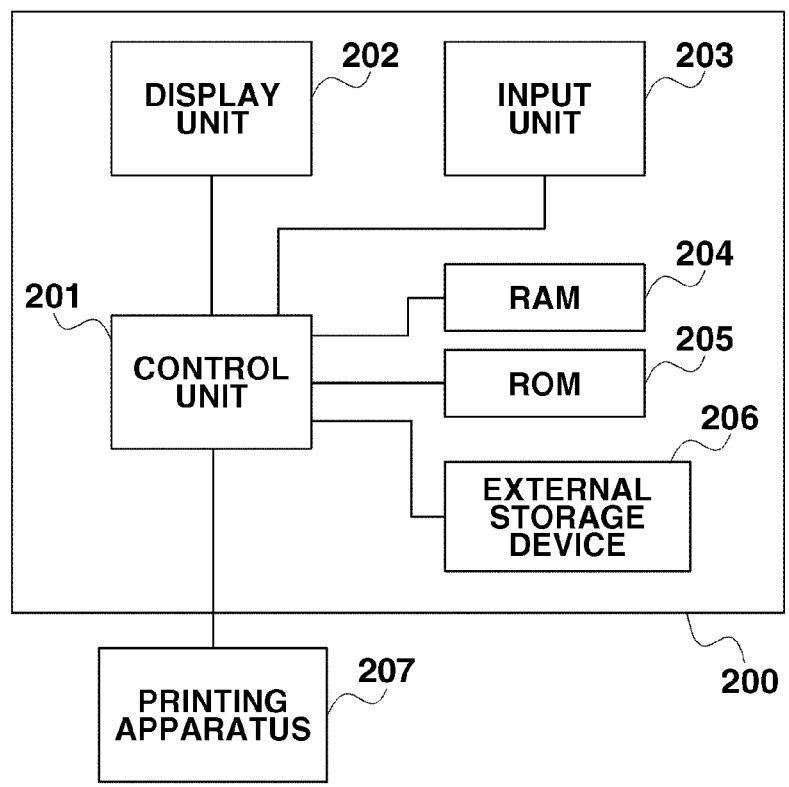
FIG. 2 is a block diagram illustrating an exemplary embodiment of the present invention.

FIG. 2 is a block diagram illustrating an example of the configuration of the client computer 103 and the client computer 106 (hereinafter, these are collectively referred to as "information processing apparatus 200"), which are information processing apparatuses applied to the exemplary embodiments of the present invention.

A control unit 201 is a central processing unit (CPU), which controls the various units in the information processing apparatus 200, such as a display unit 202 and an input unit 203. The display unit 202 is a display device, such as a cathode ray tube (CRT) or a liquid crystal monitor. The input unit 203 corresponds to a keyboard or a pointing device such as a mouse.

A random access memory (RAM) 204 is a nonvolatile, large-capacity memory, which stores various program codes and data files loaded from a read-only memory (ROM) 205. The ROM 205 stores computer programs executed by the control unit 201. An external storage apparatus 206 is configured from a hard disk and a drive unit for reading and writing data from/onto the hard disk. The external storage apparatus 206 can also exchange data stored on a separate hard disk via a network. The external storage apparatus 206 stores the data that is necessary for printing.

A printing apparatus 207 is connected to the information processing apparatus 200 by a network or a cable, and, can send data thereto. Further, the printing apparatus 207 corresponds to the printing apparatus 104 or the printing apparatus 107 illustrated in FIG. 1. An operating system (OS) stored in the RAM 204 controls the execution processing of the various applications and the input processing from the input unit 203.

Although the present exemplary embodiment is described with the program code loaded in the RAM 204, the program code may also be directly executed from the ROM 205. Further, although the present exemplary embodiment is described with the various data serving as the processing target in the RAM 204, all of this data may be on the external storage apparatus 206, and used by loading as necessary into the RAM 204 from the external storage apparatus 206. In addition, this data may also be on a cache memory of the control unit 201.

Figure 3:
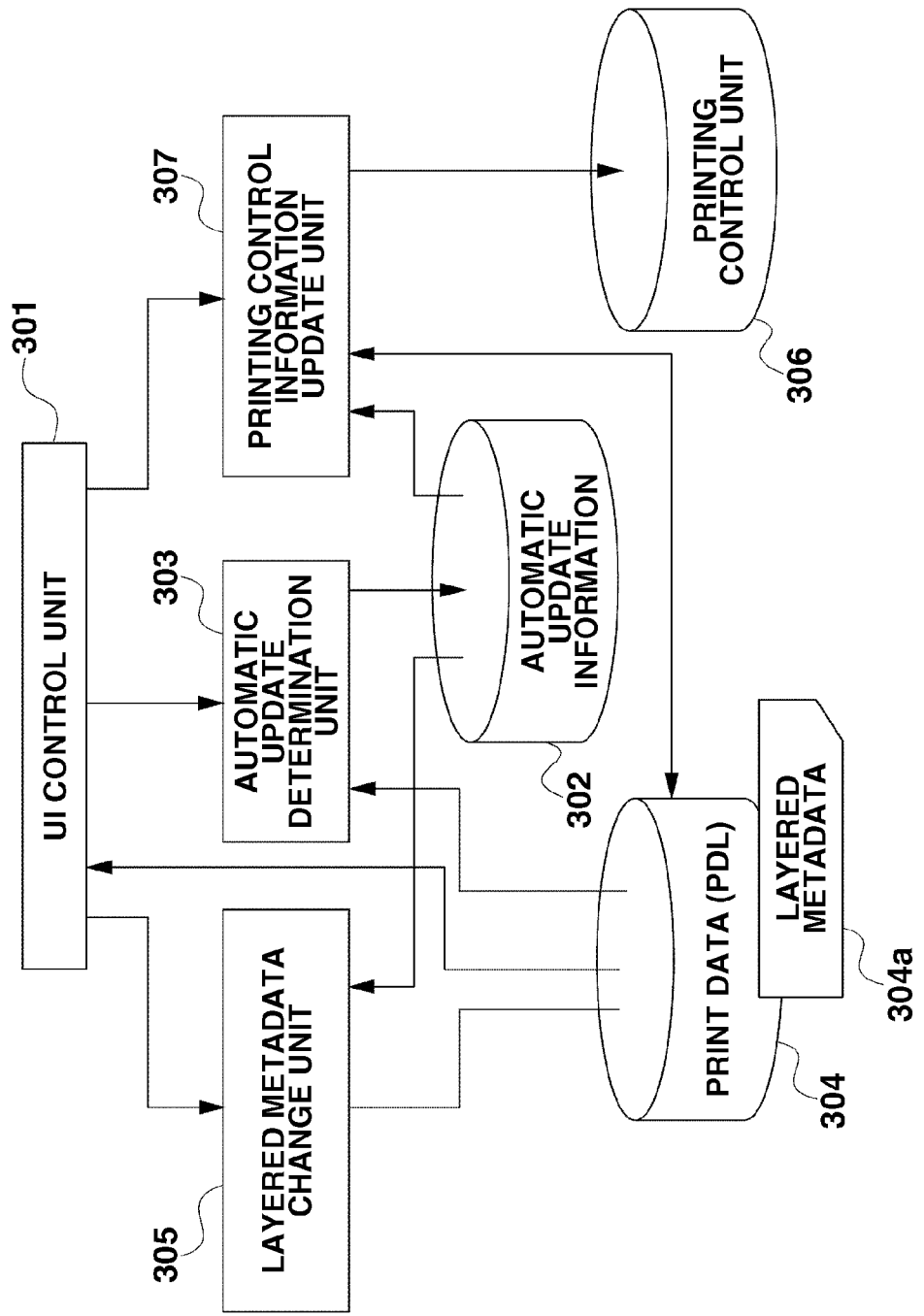
FIG. 3 is a data flow diagram illustrating an exemplary embodiment of the present invention.

FIG. 3 is a data flow diagram illustrating how the program code and the data handled in the present exemplary embodiment are related. A user interface (UI) control unit 301 handles the data input via the input unit 203 illustrated in FIG. 2. The user can instruct each of the processing units to input data using this UI control unit 301.

The UI control unit 301 has a hierarchical structure, in which print data (PD) 304 to which metadata can be added is loaded from the external storage apparatus 206 in FIG. 2, and displayed on the display unit 202 in FIG. 2.

Automatic update information 302 is stored in the RAM 204 of FIG. 2. An automatic update determination unit 303 receives an instruction from the UI control unit 301 and operates. The automatic update determination unit 303 stores contents relating to the update method of the print data 304 instructed by the user as automatic update information 302.

Layered metadata 304a accompanies the print data 304. A layered metadata change unit 305 receives an instruction from the UI control unit 301. The layered metadata change unit 305 finally changes the layered metadata 304a based on a user instruction for grouping or grouping release.

Print control information 306 is present in the external storage apparatus 206 illustrated in FIG. 2. The printing apparatus 207 in FIG. 2 performs printing based on the printing control information 306. A printing control information update unit 307 updates the printing control information 306 and the layered metadata 304a. Further, the UI control unit 301, the automatic update determination unit 303, the layered metadata change unit 305, and the printing control information update unit 307 are operated by the control unit 201 based on the program code stored in the ROM 205.

The processing procedures in the below-described flowcharts is not limited to that described in the following exemplary embodiments. As long as the effects of the present invention can be achieved, the procedures may be performed in any combination, multiple processes may be performed together, and the processes maybe split into more detailed sub-processes. Further, each process may be taken individually and made to function as a standalone functional element, and used in combination with process other than those illustrated. The exemplary embodiments according to the present invention will now be described with reference to the drawings and flowcharts.

Figure 4:
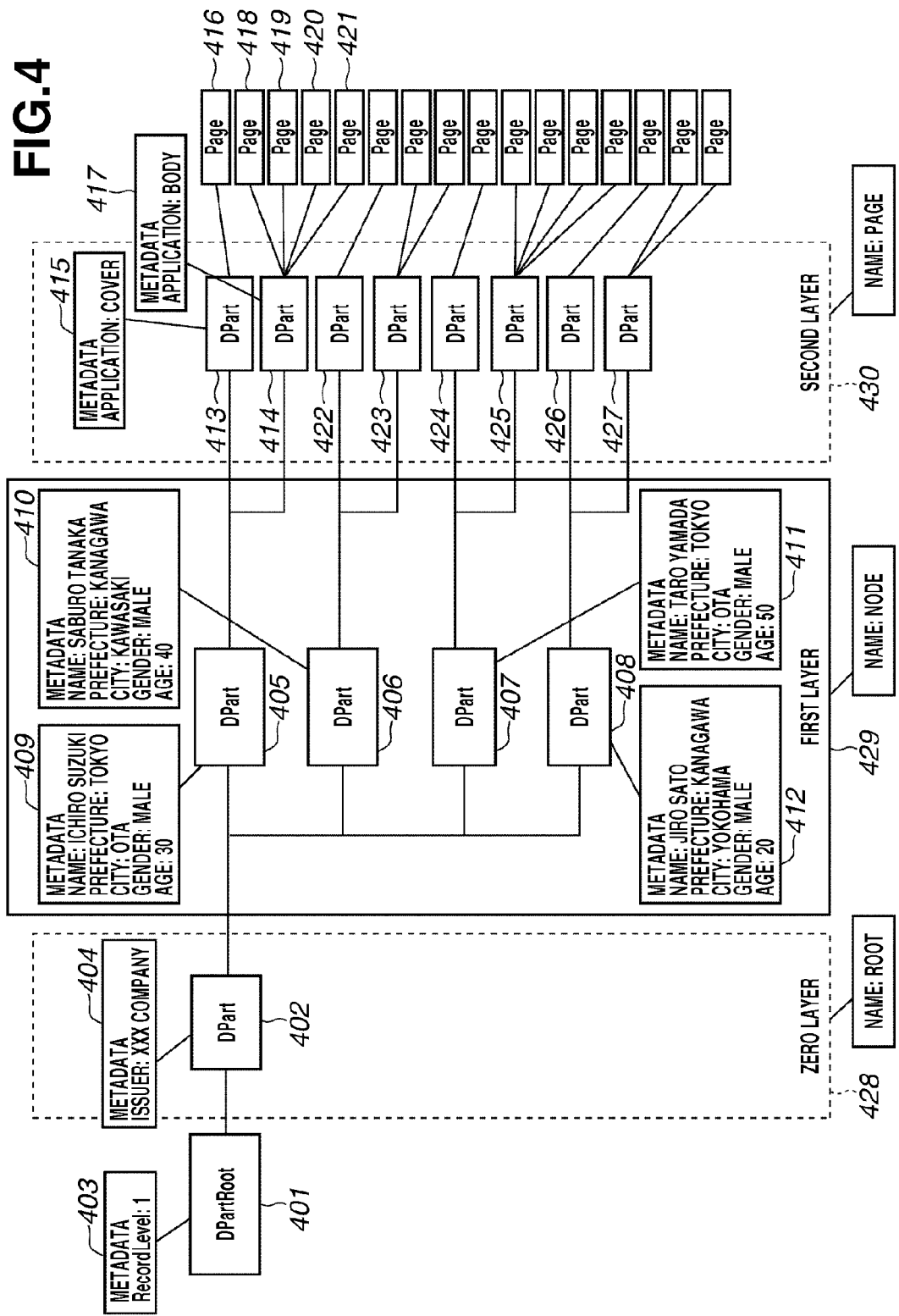
FIG. 4 illustrates an example of layered metadata.

FIG. 4 is an image diagram illustrating an example of the layered metadata 304a in FIG. 3. A parent node 401, called a DPartRoot, has a data structure in which layered metadata is compiled. Below the DPartRoot 401, a DPart 402 is linked as a child node, thereby forming a hierarchical structure.

Further, the DPartRoot 401 has metadata 403, which has a value of 1 for a "record level" key. The "record level" indicates which layer in the hierarchical structure is to be repeatedly processed. Specifically, when the value is 1, the first layer is the layer to be repeatedly processed.

The DPart 402 has metadata 404, which has a value of "XXX Company" for an "issuer" key. Further, the DPart 402 has a DPart 405, a DPart 406, a DPart 407, and a DPart 408 in a lower hierarchy as child nodes.

The DPart 405 has metadata 409, which has a value of "Ichiro Suzuki" for a "name" key, a value of "Tokyo" for a "prefecture" key, a value of "Ota" for a "city" key, a value of "male" for a "gender" key, and a value of "30" for an "age" key. The DPart 406 has metadata 410, which has a value of "Saburo Tanaka" for the "name" key, a value of "Kanagawa" for the "prefecture" key, a value of "Kawasaki" for the "city" key, the value of "male" for the "gender" key, and a value of "40" for the "age" key.

The DPart 407 has metadata 411, which has a value of "Taro Yamada" for the "name" key, the value of "Tokyo" for the "prefecture" key, the value of "Ota" for the "city" key, the value of "male" for the "gender" key, and a value of "50" for the "age" key. The DPart 408 has metadata 412, which has a value of "Jiro Sato" for the "name" key, the value of "Kanagawa" for the "prefecture" key, a value of "Yokohama" for the "city" key, the value of "male" for the "gender" key, and a value of "20" for the "age" key.

The DPart 405 has a DPart 413 and a DPart 414 in a lower hierarchy as child nodes. Metadata 415 in the DPart 413 has a value of "cover" for an "application" key, and refers to a page object 416 as the page indicating the cover. Metadata 417 in the DPart 414 has a value of "body" for the "application" key, and refers to a page object 418, a page object 419, a page object 420, and a page object 421 as the pages indicating the body.

The DPart 406 has a DPart 422 and a DPart 423 in a lower hierarchy as child nodes. Similar to the DPart 413, DPart 422 has metadata with a value of "cover" for the "application" key and a reference to a page object. Further, similar to the DPart 414, DPart 423 has metadata with a value of "body" for the "application" key and a page object.

The DPart 407 has a DPart 424 and a DPart 425 in a lower hierarchy as child nodes . Similar to the DPart 413, DPart 424 has metadata with a value of "cover" for the "application" key and a reference to a page object. Further, similar to the DPart 414, DPart 425 has metadata with a value of "body" for the "application" key and a page object.

The DPart 408 has a DPart 426 and a DPart 427 in a lower hierarchy as child nodes . Similar to the DPart 413, DPart 426 has metadata with a value of "cover" for the "application" key and a reference to a page object. Further, similar to the DPart 414, DPart 427 has metadata with a value of "body" for the "application" key and a page object.

Zero layer 428 indicates the fact that the DPart 402 following the DPartRoot 401 belongs to the zero layer, and the fact that the layer name is "Root" (hereinafter, the zero layer 428 is also described as "Root layer 428"). Node layer 429 indicates the fact that the DPart 405, the DPart 406, the DPart 407, and the DPart 408 belong to the first layer, and the fact that the layer name is "Node" (hereinafter, the first layer 429 is also described as "Node layer 429").

Second layer 430 indicates the fact that the DPart 413, the DPart 414, the DPart 422, the DPart 423, the DPart 424, the DPart 425, the DPart 426, and the DPart 427 belong to the second layer, and the fact that the layer name of the second layer is "Page" (hereinafter, the second layer 430 is also described as "Page layer 430"). Thus, the metadata is stored in a layer type data structure called "DParts".

Figure 5:
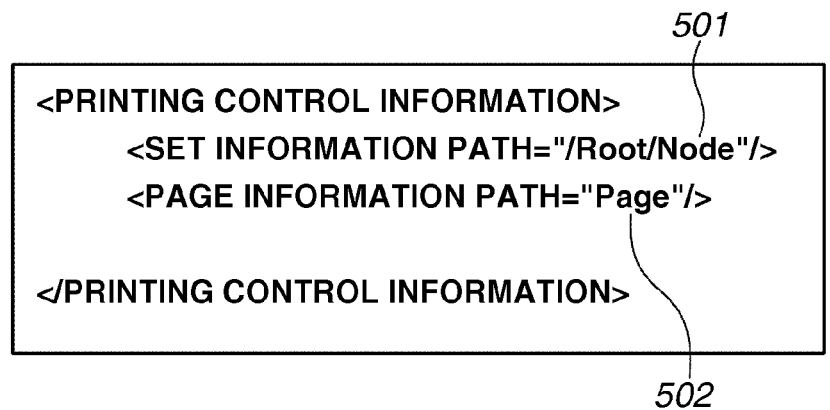
FIG. 5 illustrates printing control information.

FIG. 5 illustrates an example of the printing control information 306 in FIG. 3. Set information 501 indicates which layer is the unit to be repeatedly processed. The set information 501 is referred to based on XPath using an extensible markup language (XML) in the DParts. In FIG. 5, the Node layer 429, which is a lower hierarchy than the Root layer 428 in the layered metadata 304a, is indicated as being the layer to be repeatedly processed.

Page information 502 indicates which layer is referring to a page object. In FIG. 5, the Page layer 430, which is a lower hierarchy than the Node layer 429 in the layered metadata 304a, is indicated as being the layer referring to the page object. In this example, although the page information is expressed using a relative path based on the set information, like the set information, an absolute path can similarly be used.

Further, the control unit 201 in FIG. 2 can issue a print instruction to the printing apparatus 207 using the set information 501 and the page information 502, which are repeat units, based on the printing control information 306. The printing control information illustrated here is merely one example, and job ticket or print ticket of JDF and the like can similarly be used.

Figure 6:
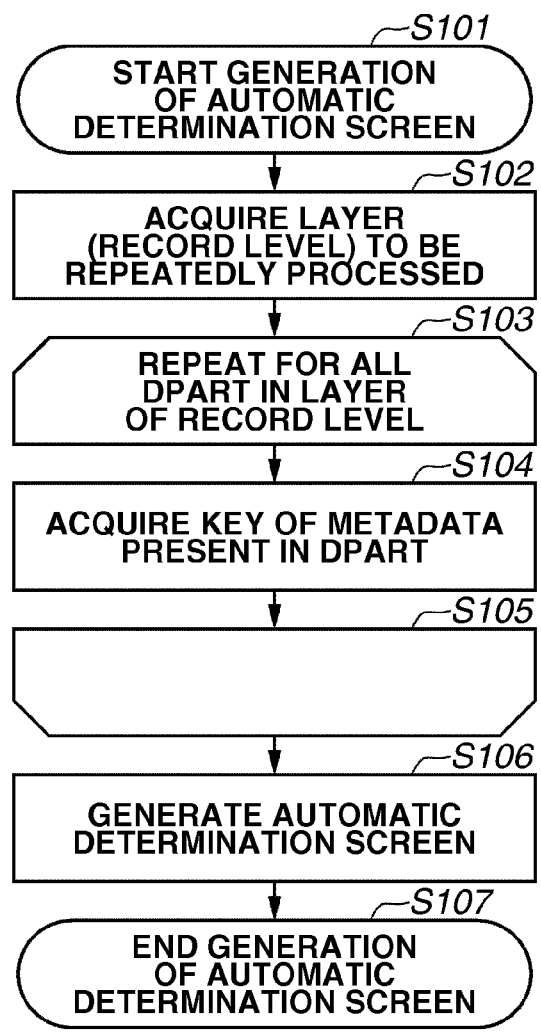
FIG. 6 is a flowchart relating to generation of an automatic update determination screen.

FIG. 6 is a flowchart illustrating when the UI control unit 301 in FIG. 3 instructs the automatic update determination unit 303 to generate an automatic update determination screen.

In step S101, the UI control unit 301 starts the processing of this flowchart by instructing the automatic update determination unit 303 to generate a screen for setting the automatic update information 302.

In step S102, the automatic update determination unit 303 acquires the layer to be repeatedly processed (the record level) from the layered metadata 304a. In step S103, the automatic update determination unit 303 repeats step S104 with all of the DParts in the record level as the target.

In step S104, the automatic update determination unit 303 acquires the metadata key present in the target DPart. In step S105, the automatic update determination unit 303 performs the processing of step S104 on all of the DParts included in the record level, and the processing then proceeds to step S106. Based on the processing up to this point, the metadata keys present in all of the DParts included in the record level are acquired.

In step S106, the automatic update determination unit 303 generates an automatic update determination screen which is displayed in a state that allows the keys acquired by the processing up to step S105 to be selected. Once the automatic update determination unit 303 has generated the automatic update determination screen in step S106, the processing proceeds to step S107, and the processing of this flowchart is finished.

The automatic update determination screen generated by the automatic update determination screen generation processing in this flowchart is displayed on the display unit 202 based on display control performed by the UI control unit 301.

Figure 7:
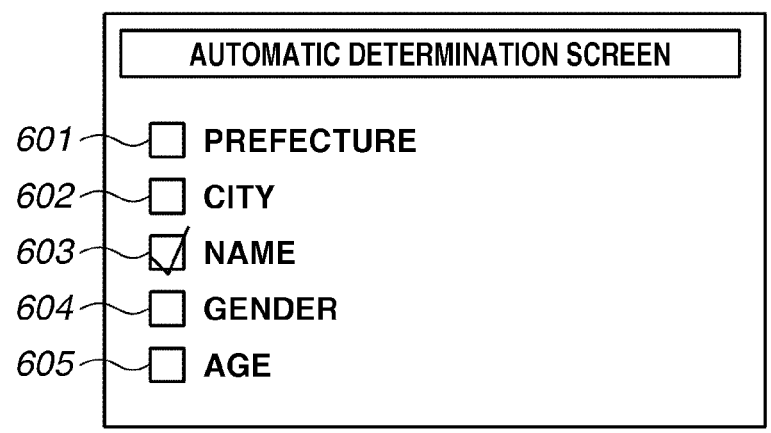
FIG. 7 illustrates an example of an automatic update determination screen.

FIG. 7 is an image diagram illustrating an example of the automatic update determination screen obtained based on the processing executed in the flowchart of FIG. 6 on the layered metadata of FIG. 4. In FIG. 7, a diagram is illustrated in which the user has selected the "name" key from among the metadata keys.

Check boxes 601 to 605 represent key candidates that can be selected by the user. All of the keys included in the first layer (Node layer) 429, which is the record level, are listed. The screen is configured so that any one of these check boxes can be selected.

The check box 601 represents the "prefecture" key. If the check box 601 is selected, the layer present in the "prefecture" will be automatically updated as the layer to be repeatedly processed. Similarly, for the check boxes 602 to 605, if "city", "name", "gender", or "age" is selected, the layer present in that respective key will be automatically updated as the layer to be repeatedly processed.

In FIG. 7, since "name" is selected, when a grouping has been confirmed, the layer in which the "name" key is present will become the layer to be repeatedly processed. More specifically, when a new grouping of the layered metadata 304a is performed or a grouping is released, the layer in which the "name" key is finally present is determined to be the record level, and the printing control information 306 is updated.

Thus, by setting the key for determining the record level in advance, the layer containing the key that the user really wishes to be repeatedly processed can be set as the record level, even if the metadata is edited. The key corresponding to the record level selected on the automatic update determination screen is stored in the RAM 204 by the automatic update determination unit 303 as the automatic update information 302.

FIG. 8 is a flowchart illustrating when the UI control unit 301 in FIG. 3 instructs the layered metadata change unit 305 to generate a layered metadata change screen.

In step S201, the UI control unit 301 starts the processing of this flowchart by instructing the layered metadata change unit 305 to generate a screen for performing grouping of the layered metadata 304a or releasing a grouping. In step S202, the layered metadata change unit 305 repeats the processing of steps S203 to S206 on all of the layers included in the layered metadata 304a.

In step S203, the layered metadata change unit 305 repeats the processing of step S204 on all of the DParts in the layer of the processing target. In step S204, the layered metadata change unit 305 acquires the key and the value corresponding to the key from the metadata of the DPart of the processing target.

In step S205, the layered metadata change unit 305 performs the processing of step S204 on all of the DParts in the layer of the processing target, and the processing then proceeds to step S206.

In step S206, the layered metadata change unit 305 performs screen generation for one layer corresponding to the processing layer based on the key and value combinations obtained in step S204. The screen generated in this step is a layered metadata change screen for one layer, which is configured so that it can receive an instruction for performing grouping processing of the layered metadata based on an operation from the user.

In step S207, the layered metadata change unit 305 performs the processing of steps S203 to S206 on all of the layers. The processing then proceeds to step S208, and the processing of this flowchart is finished. The layered metadata change screen generated by the layered metadata change screen generation processing in this flowchart is displayed on the display unit 202 based on display control performed by the UI control unit 301.

FIG. 9A is an image diagram illustrating an example of a layered metadata change screen obtained based on the processing executed in the flowchart of FIG. 8 on the layered metadata 304a of FIG. 4. To simplify the description of FIG. 9A, only the layered metadata change screen corresponding to the first layer 429 of the layered metadata 304a of FIG. 4 is illustrated.

A layered metadata change screen 701 indicates the fact that "name", "prefecture", "city", "gender", and "age" are present as metadata keys. A value 702 is indicated for each key in the DPart 405. As the value for the "name" key, "Ichiro Suzuki" is mapped. Similarly, "Tokyo" is mapped as the value for the "prefecture" key, "Ota" is mapped as the value for the "city" key, "male" is mapped as the value for the "gender" key, and "30" is mapped as the value for the "age" key.

A value 703 is indicated for each key in the DPart 406. The values for the "name", "prefecture", "city", "gender", and "age" are respectively mapped as "Saburo Tanaka", "Kanagawa", "Kawasaki", "male", and "40".

A value 704 is indicated for each key in the DPart 407. The values for the "name", "prefecture", "city", "gender", and "age" are respectively mapped as "Taro Yamada", "Tokyo", "Ota", "male", and "50".

A value 705 is indicated for each key in the DPart 407. The values for the "name", "prefecture", "city", "gender", and "age" are respectively mapped as "Jiro Sato", "Kanagawa", "Yokohama", "male", and "20".

Grouping buttons 706 and 707 are used to perform a new grouping for the "name" key. Grouping buttons 708 and 709 are used to perform a new grouping for the "prefecture" key.

Grouping buttons 710 and 711 are used to perform a new grouping for the "city" key. Grouping buttons 712 and 713 are used to perform a new grouping for the "gender" key. Grouping buttons 714 and 715 are used to perform a new grouping for the "age" key.

For example, if the grouping button 708 is clicked (pressed once), the "prefecture" key among the metadata present in the first layer is newly grouped in a higher hierarchy, and the remaining keys are present in the second layer.

FIG. 9B illustrates an image diagram of a layered metadata change screen after grouping is executed by pressing the grouping button 708 for the "prefecture" key in FIG. 9A. DPart metadata 716 is present in the first layer, in which the "prefecture" key is present. DPart metadata 717 is present in the second layer, which is a layer lower hierarchy than the first layer, in which the "prefecture" key is present.

A button 718 is a releasing button for releasing the grouping for the "prefecture" key. When the button 718 is pressed, the grouping is released and returns to the state illustrated in FIG. 9A, in which all of the metadata key and value pairs have moved to the first layer.

Similar to the grouping button 710 in FIG. 9A, a grouping button 719 is for performing grouping for the "city" key. When the button 719 is clicked (pressed), separate from the first layer in which the "prefecture" key is present, the "city" key among the metadata present in the second layer is newly grouped in a higher hierarchy, and the remaining keys are present in the third layer.

FIG. 9C illustrates an image diagram of a layered metadata change screen after grouping is executed by pressing the grouping button 719 in FIG. 9B. DPart metadata 720 is present in the first layer in which the "prefecture" key is present.

DPart metadata 721 is present in the second layer, in which the "city" key is present. DPart metadata 722 is present in the third layer, in which the keys other than "prefecture" and "city" are present.

A grouping button 723 for the "city" key performs grouping by moving the "city" key to a higher hierarchy. When the button 723 is clicked (pressed), the "city" key is moved to the same layer as the "prefecture" key. Consequently, the "prefecture" key and the "city" key are present in the first layer.

If two or more keys are present on the same layer, the grouping is performed by setting an "&" (and) condition in that layer. More specifically, when the button 723 is pressed, the grouping is performed for the "prefecture" key and the "city" key pairs based on an & (and) condition.

Further, if not even one key is present in the second layer, the second layer is deleted. Finally, a total of three pairs, the pair of "Tokyo" and "Ota", the pair of "Kanagawa" and "Kawasaki", and the pair of "Kanagawa" and "Yokohama", are in the first layer and the remaining pairs are in the second layer.

In addition, if the "city" key is moved so that there is no longer any keys in the second layer like when the button 723 is clicked, although the layer is automatically deleted, if there is a change in the number of layers, a warning dialog may be displayed to alert the user.

A grouping button 724 for the "city" key performs grouping by moving the "city" key to a lower hierarchy. When the button 724 is clicked, the "city" key is moved to the same layer as the "name" key. Like when the button 723 is clicked, there is no longer any keys present in the second layer, so that the second layer is deleted. Finally, the first layer remains as is, and all the remaining keys are present in the second layer. The result looks like the state illustrated in FIG. 9B.

FIG. 9D illustrates an image diagram of a layered metadata change screen after grouping is executed by pressing the grouping button 723 in FIG. 9C. DPart metadata 725 is present in the first layer, in which the "prefecture" and "city" keys are present. The "prefecture" and "city" keys are grouped by an & (and). DPart metadata 726 is present in the second layer, in which the keys other than the "prefecture" and "city" keys are present.

When a grouping button 727 for the "city" key is pressed, the "city" key is moved to a lower hierarchy, and the grouping is released. If the button 727 is pressed, grouping is newly performed based on the "city" unit in a lower hierarchy (i.e., the third layer) separate to the second layer. The result looks like the state illustrated in FIG. 9C.

Thus, a new grouping can be performed or a grouping can be released by performing an operation on the layered metadata 304a by the layered metadata change screen, so that the hierarchical structure of the metadata can be changed. Further, if the number of groupings is larger than the number defined when performing the grouping, a warning dialog box may be displayed to alert the user by inquiring him/her to confirm the grouping.

Figure 10:
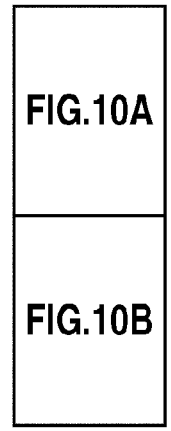
FIG. 10 (10A and 10B) is a flowchart relating to grouping.
Figure 10A:
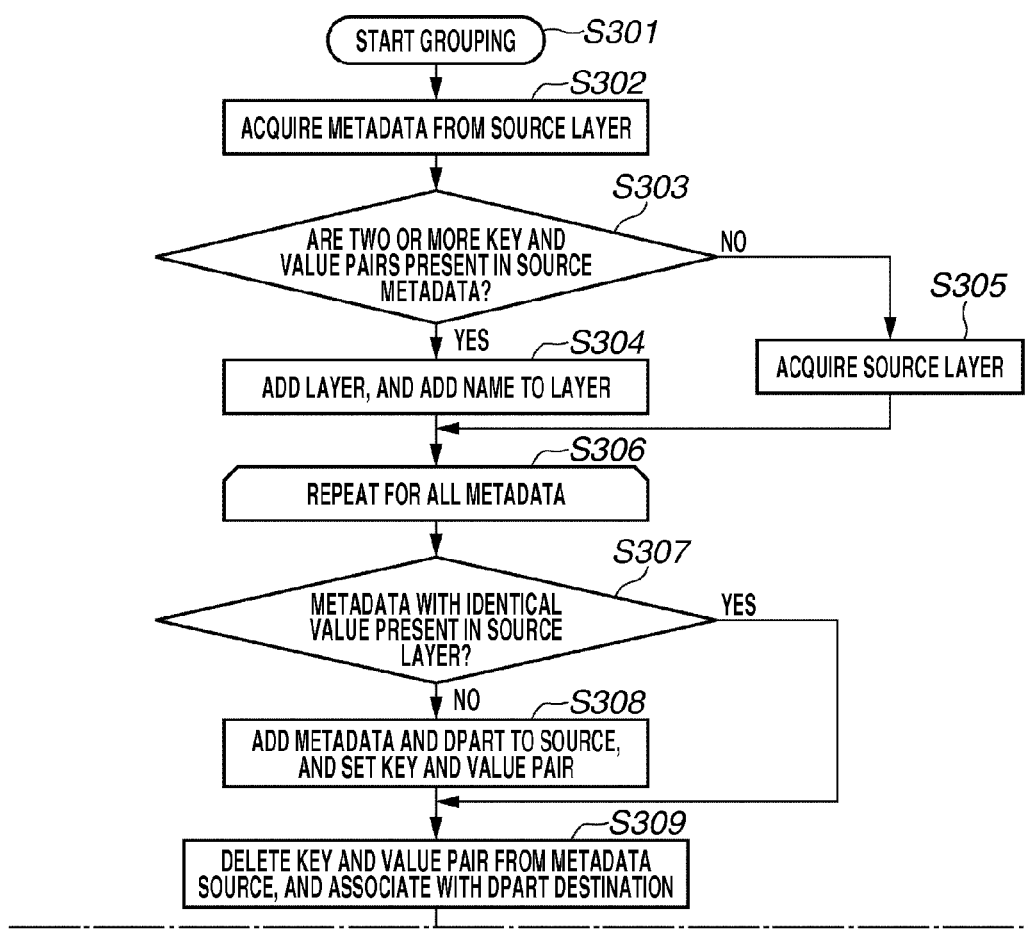
Figure 10B:
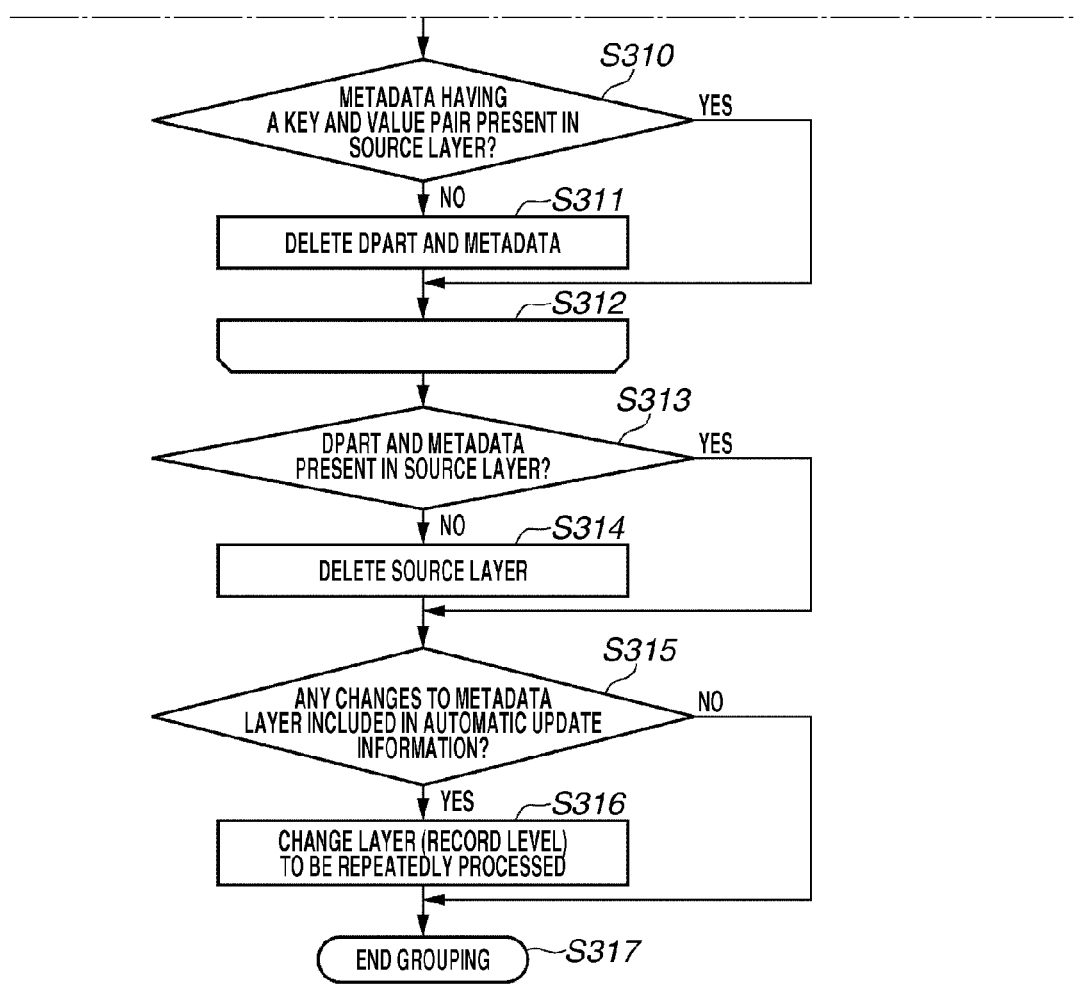

FIG. 10 (10A and 10B) is a flowchart illustrating the grouping processing performed by the layered metadata change unit 305 based on an instruction from the UI control unit 301 in FIG. 3. This grouping processing includes processing for performing grouping by moving metadata to the same layer as the metadata in another layer, and processing for releasing a grouping by moving metadata to a different layer to the metadata in the same layer.

In step S301, the UI control unit 301 starts the processing of this flowchart by instructing layered metadata change unit 305 to perform grouping or to release a grouping of the layered metadata 304a. In step S302, the layered metadata change unit 305 acquires the metadata belonging to a source layer.

In step S303, the layered metadata change unit 305 determines whether two or more key and value pairs are present in the source metadata. In step S303, if it is determined that two or more key and value pairs are present (YES in step S303), the processing proceeds to step S304. On the other hand, if it is determined that two or more key and value pairs are not present (NO in step S303), the processing proceeds to step S305.

In step S304, the layered metadata change unit 305 newly produces a layer for performing grouping processing, and adds a name to the layer. In step S305, the layered metadata change unit 305 acquires the destination layer for performing grouping.

In step S306, the layered metadata change unit 305 repeats the processing of steps S307 to S312 for the metadata acquired in step S302.

In step S307, the layered metadata change unit 305 determines whether metadata with an identical value for the key is present in the destination layer. In step S307, if it is determined that metadata with an identical value is not present (NO in step S307), the processing proceeds to step S308. On the other hand, if it is determined that metadata with an identical value is present (YES in step S307), the processing proceeds to step S309.

In step S308, the layered metadata change unit 305 adds a DPart and metadata to the destination layer, and adds a key and value pair to the metadata. However, sometimes the source and the metadata may be used as is, like when the button 723 in FIG. 9C is clicked, so that the "city" key is moved to the first layer, and grouping is re-performed based on an & (and) condition of the "prefecture" key and the "city" key. Similarly, another example is when an already-present key and value pair is copied.

In the case of FIG. 9C, when re-grouping by moving the "city" key, since "prefecture" is already present, the DPart and the metadata are produced, and a key and value pair relating to "prefecture" is also set.

In step S309, the layered metadata change unit 305 deletes the key and value pair from the metadata in the source layer, and associates this pair with a DPart section between the destination and the source. In this example, although the key and value pair in the source metadata is deleted, the same association is made even if this key and value pair is kept.

In step S310, the layered metadata change unit 305 determines whether there is any metadata having a key and value pair present in the source layer. If it is determined, in step S310, that there is no metadata having a key and value pair (NO in step S310), the processing proceeds to step S311. If it is determined, in step S310, that there is metadata having a key and value pair (YES in step S310), the processing proceeds to step S312.

In step S311, the layered metadata change unit 305 deletes the DPart corresponding to the metadata of the processing target and the metadata. In step S312, the layered metadata change unit 305 performs the processing on all of the metadata acquired in step S302, and the processing then proceeds to step S313.

In step S313, the layered metadata change unit 305 determines whether one or more DParts and metadata are present in the source layer. If it is determined, in step S313, that there is no DPart and metadata present (NO in step S313), the processing proceeds to step S314. If it is determined, instep S313, that there is even one DPart and metadata present (YES in step S313), the processing proceeds to step S315.

In step S314, the layered metadata change unit 305 deletes the source layer.

In step S315, the layered metadata change unit 305 determines whether there are any changes from the previous layer in the layer in which the metadata key selected on the automatic update determination screen is present. If it is determined, in step S315, that there are changes (YES in step S315), the processing proceeds to step S316. If it is determined, in step S315, that there are no changes (NO in step S315), the processing proceeds to step S317, and the processing of this flowchart is finished. Based on this determination, it is determined whether the layered metadata record level needs to be changed.

In step S316, the layered metadata change unit 305 performs processing to change the layer to be repeatedly processed (the record level). More specifically, the key to be included in the metadata of the record level is extracted from the automatic update information 302, and the layer in which this key is present is set as the record level.

In step S316, change processing is performed. The processing then proceeds to step S317, and the processing of this flowchart is finished. The result of the grouping performed based on this flowchart is reflected in the layered metadata change screen by executing the processing illustrated in the flowchart of FIG. 8 again.

FIG. 11A illustrates the layered metadata 304a of FIG. 4 and layered metadata 304a obtained by executing the flowchart of FIG. 10 (10A and 10B), when grouping is instructed to be performed based on "prefecture" on the layered metadata change screen 701 illustrated in FIG. 9A.

Like the DPartRoot 401 in FIG. 4, a parent node 801 has a data structure in which layered metadata is compiled. Below the DPartRoot 801, a DPart 802 is linked as a child node, thereby forming a hierarchical structure. Further, the DPartRoot 801 has metadata 803, in which the key is "record level".

DPart 804 is produced in step S308 of FIG. 10, based on a determination in step S307 of FIG. 10 that there is no metadata having an identical value present in the destination layer for "Tokyo" in the metadata 409 in FIG. 4.

Similarly to the DPart 804, metadata 805 is set with a key and a value in step S308 of FIG. 10, based on a determination in step S307 of FIG. 10 that there is no metadata having an identical value present in the destination layer for "Tokyo" in the metadata 409 in FIG. 4.

DPart 806 is produced in step S308 of FIG. 10, based on a determination in step S307 of FIG. 10 that there is no metadata having an identical value present in the destination layer for "Kanagawa" in the metadata 410 in FIG. 4.

Similarly to the DPart 806, metadata 807 is set with a key and a value in step S308 of FIG. 10, based on a determination in step S307 of FIG. 10 that there is no metadata having an identical value present in the destination layer for "Kanagawa" in the metadata 410 in FIG. 4.

For the metadata 411 and 412 in FIG. 4, since metadata having an identical value is already present, the processing of step S308 in FIG. 10 is skipped. DParts 808 and 809 are DParts newly associated with the source and the destination in step S309 in FIG. 10. DParts 808 and 809 are each child nodes of the DPart 804.

Metadata 810 and 811 are respectively metadata for the DParts 808 and 809, in which the "prefecture" key and value pair is deleted in step S309 of FIG. 10. DParts 812 and 813 are DParts newly associated with the source and the destination in step S309 in FIG. 10. DParts 812 and 813 are each child nodes of the DPart 806.

Metadata 814 and 815 are respectively metadata for the DParts 812 and 813, in which the "prefecture" key and value pair was deleted in step S309 of FIG. 10.

First layer 816 has a layer name "Node_0". First layer 816 is a layer that was newly produced in step S304, based on a determination in step S303 of FIG. 10 that two or more key and value pairs are present in the source metadata of FIG. 9A.

In step S315 of FIG. 10, the layered metadata change unit 305 determines that the layer in which the "name" key is present has been changed from the first layer to the second layer. Consequently, in step S316, the layered metadata change unit 305 changes the "record level" of the metadata 803 from 1 to 2, so that the second layer becomes the layer to be repeatedly processed.

FIG. 11B is an image diagram illustrating the layered metadata 304a of FIG. 11A and layered metadata 304a obtained by executing the flowchart of FIG. 10, when grouping was instructed to be performed based on "city" on the layered metadata change screen 701 illustrated in FIG. 9B.

Like the DPartRoot 401 in FIG. 4, a parent node 817 has a data structure in which layered metadata is compiled. Below the DPartRoot 817, a DPart 818 is linked as a child node, thereby forming a hierarchical structure. Further, the DPartRoot 817 has metadata 819, in which the key is "record level". In addition, the DPart 818 has a DPart 820 and a DPart 821 as child nodes. The DPart 820 has metadata 822, and the DPart 821 has metadata 823.

DPart 824 is a DPart that is newly produced in step S308 of FIG. 10, when grouping is performed based on "city". In the DPart 824, there is no metadata having an identical value in the destination layer. Similarly to the DPart 824, metadata 825 is metadata that is set with a key and a value in step S308 of FIG. 10, based on a determination in step S307 of FIG. 10 that there is no metadata having an identical value present in the destination layer.

DPart 826 is a DPart that is produced in step S308 of FIG. 10, based on a determination in step S307 of FIG. 10 that there is no metadata having an identical value in the destination layer.

Similarly to the DPart 826, metadata 827 is metadata that is set with a key and a value in step S308 of FIG. 10, based on a determination in step S307 of FIG. 10 that there is no metadata having an identical value present in the destination layer.

DPart 828 is a DPart that is produced in step S308 of FIG. 10, based on a determination in step S307 of FIG. 10 that there is no metadata having an identical value in the destination layer.

Similarly to the DPart 828, metadata 829 is metadata that is set with a key and a value in step S308 of FIG. 10, based on a determination in step S307 of FIG. 10 that there is no metadata having an identical value present in the destination layer.

For the metadata 811 in FIG. 11, since metadata having an identical value is already present, the processing of step S308 in FIG. 10 is skipped. DParts 830 and 833 are DParts newly associated with the source and the destination in step S309 in FIG. 10.

Metadata 834 to 837 are respectively metadata for the DParts 830 to 833, in which the "city" key and value pair is deleted in step S309 of FIG. 10.

Second layer 838 has a layer name "Node_1". The second layer 838 is a layer in which the DPart 824, the DPart 826, and the DPart 828 are newly added in step S304 of FIG. 10.

In step S315 of FIG. 10, the layered metadata change unit 305 determines that the layer in which the "name" key is present has been changed from the second layer to the third layer. Consequently, in step S316 of FIG. 10, the layered metadata change unit 305 changes the "record level" of the metadata 819 from 2 to 3, so that the third layer becomes the layer to be repeatedly processed.

FIG. 11C is an image diagram illustrating the layered metadata 304a of FIG. 11B and layered metadata 304a obtained by executing the flowchart of FIG. 10 by the layered metadata change screen 701 illustrated in FIG. 9C. More specifically, FIG. 11C illustrates layered metadata 304a after the button 723 is clicked on the layered metadata change screen 701 illustrated in FIG. 7C to perform grouping based on a "city" and a "prefecture" & (and) condition.

Like the DPartRoot 401 in FIG. 4, a parent node 801 has a data structure in which layered metadata is compiled. Below the DPartRoot 839, a DPart 840 is linked as a child node, thereby forming a hierarchical structure. Further, the DPartRoot 839 has metadata 841, in which the key is "record level".

DPart 842 is a DPart obtained as a result of moving the DPart 824 illustrated in FIG. 11B to the first layer. When the metadata 825 "Ota" is moved to the first layer, in step S308 of FIG. 10, the DPart 820 and the metadata 822 are used as is, and "Ota" is added, thereby producing metadata 843.

In the metadata 825, there is no longer even one key and value pair. Thus, the DPart 824 and the metadata 825 are deleted in step S311 of FIG. 10.

DPart 844 is a DPart obtained as a result of moving the DPart 826 illustrated in FIG. 11B to the first layer. When the metadata 827 "Kawasaki" is moved to the first layer, in step S308 of FIG. 10, the DPart 821 and the metadata 823 are used as is, and "Kawasaki" is added, thereby producing metadata 845.

In the metadata 827, there is no longer even one key and value pair. Thus, the DPart 826 and the metadata 827 are deleted in step S311 of FIG. 10.

DPart 846 is a DPart obtained as a result of moving the DPart 828 illustrated in FIG. 11B to the first layer. When the metadata 829 "Yokohama" is moved to the first layer, in step S308 of FIG. 10, a DPart and metadata are newly produced, and "Kanagawa" is set as the metadata "prefecture".

In addition, "Yokohama" is added, thereby producing metadata 847. In the metadata 847, there is no longer even one key and value pair. Thus, the DPart 828 and the metadata 829 are deleted in step S311 of FIG. 10.

However, in FIG. 11C, since in FIG. 9B the source metadata pair has only one key, the "city" key, the processing proceeds to step S305 of FIG. 10, and a new layer is not produced. Further, since in FIG. 11C not even one DPart or metadata is now present in the second layer, in step S313 of FIG. 10, the layer is deleted.

In step S315 of FIG. 10, the layered metadata change unit 305 determines that the layer in which the "name" key is present has been changed from the third layer to the second layer. Consequently, in step S316, the layered metadata change unit 305 changes the "record level" of the metadata 841 from 3 to 2, so that the second layer becomes the layer to be repeatedly processed.

Figure 12:
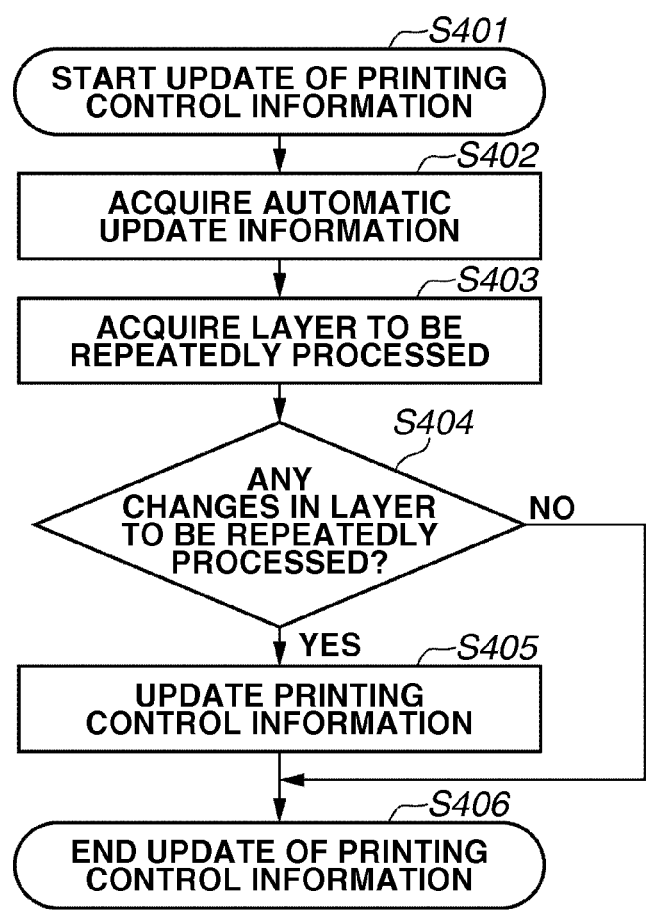
FIG. 12 is a flowchart relating to update of printing control information.

FIG. 12 is a flowchart illustrating when editing is performed on the layered metadata change screen to confirm the layered metadata 304a, and the UI control unit 301 illustrated in FIG. 3 instructs the printing control information update unit 307 to update the printing control information.

In step S401, the UI control unit 301 starts the processing of this flowchart by instructing the printing control information update unit 307 to update the printing control information. In step S402, the printing control information update unit 307 acquires the automatic update information 302. In step S403, the printing control information update unit 307 acquires the layer that will become the repeated processing target (the record level), to which the metadata key selected on the automatic update determination screen of FIG. 7 from the automatic update information 302 belongs.

In step S404, the printing control information update unit 307 determines whether there are any changes in the layer to be repeatedly processed. If it is determined, in step S404, that there are changes in the layer to be repeatedly processed (YES in step S404), the processing proceeds to step S405. If it is determined, in step S404, that there aren't any changes in the layer to be repeatedly processed (NO in step S404), the processing proceeds to step S406, and the processing of this flowchart is finished.

In step S405, the printing control information update unit 307 updates the printing control information 306 based on the changes. Once the processing for updating the printing control information 306 is performed in step S405, the processing proceeds to step S406, and the processing of this flowchart is finished. Thus, the printing control information 306 is updated by executing the flowchart illustrated in FIG. 12.

Figure 13:
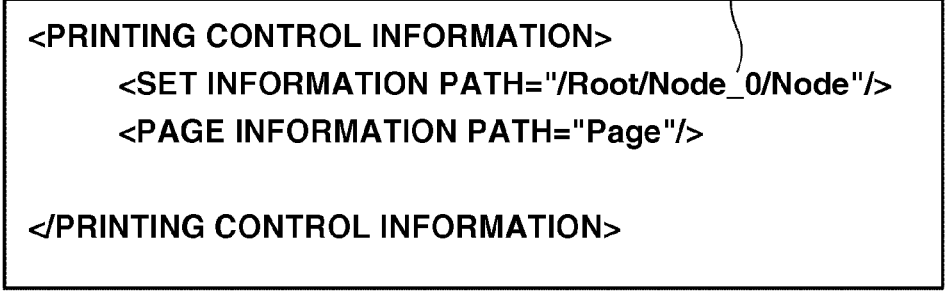
FIG. 13 illustrates printing control information.

FIG. 13 is an image diagram of the printing control information 306 illustrating the results of the flowchart of FIG. 12 executed on the layered metadata 304a illustrated in FIG. 11A. Set information 901 is information indicating which layer is to be repeated processing unit. In FIG. 11A, it is illustrated that the second layer, the "Node" layer, which is below the first layer "Node_0" that is below the zero layer "Root" in the layered metadata 304a, is changed to the layer to be repeatedly processed.

As described above, the layered metadata can be grouped by a simple method. Further, the consistency of the record level can be ensured by simultaneously updating the printing control information 306 referring to the layered metadata.

In the first exemplary embodiment according to the present invention, a method for automatically updating the printing control information 306 is described in which a metadata key is specified in advance, so that the layer to which the pre-specified key belongs is set as the layer to be repeatedly processed after the hierarchical structure is edited. However, it may not always be possible to update the printing control information 306.

Therefore, in the present exemplary embodiment, a method will be described which permits the hierarchical structure of the layered metadata 304a to be updated within a range in which the printing control information 306 is not updated. In the description of the present exemplary embodiment, portions which duplicate the above-described exemplary embodiment will be omitted.

FIG. 14 is an image diagram illustrating an example of an automatic update determination screen for determining the automatic update information 302 according to the second exemplary embodiment. Since the respective check boxes 1001 to 1005 are the same as the check boxes 601 to 605 in FIG. 7, a description thereof will be omitted here. Here, a fixed check box 1006 will be described.

The fixed check box 1006 is a check box for specifying whether to fix the layer to be repeatedly processed (the record level). When the check box 1006 is checked, this indicates that the layer to be repeatedly processed is fixed.

In FIG. 14, the "name" check box 1003 and the fixed check box 1006 are checked, indicating that changes to the hierarchical structure are permitted as long as the key "name" continues to be the layer to be repeatedly processed.

In this example, one key, the "name" key, is selected. However, a plurality of keys may be selected. Further, a restriction, such as a higher hierarchy key may not be moved higher than a lower hierarchy key, may also be specified in a form such as a calculation formula. More specifically, the hierarchical relationship between keys, such as the "prefecture" key and the "city" key, may be predefined as a rule.

Figure 15:
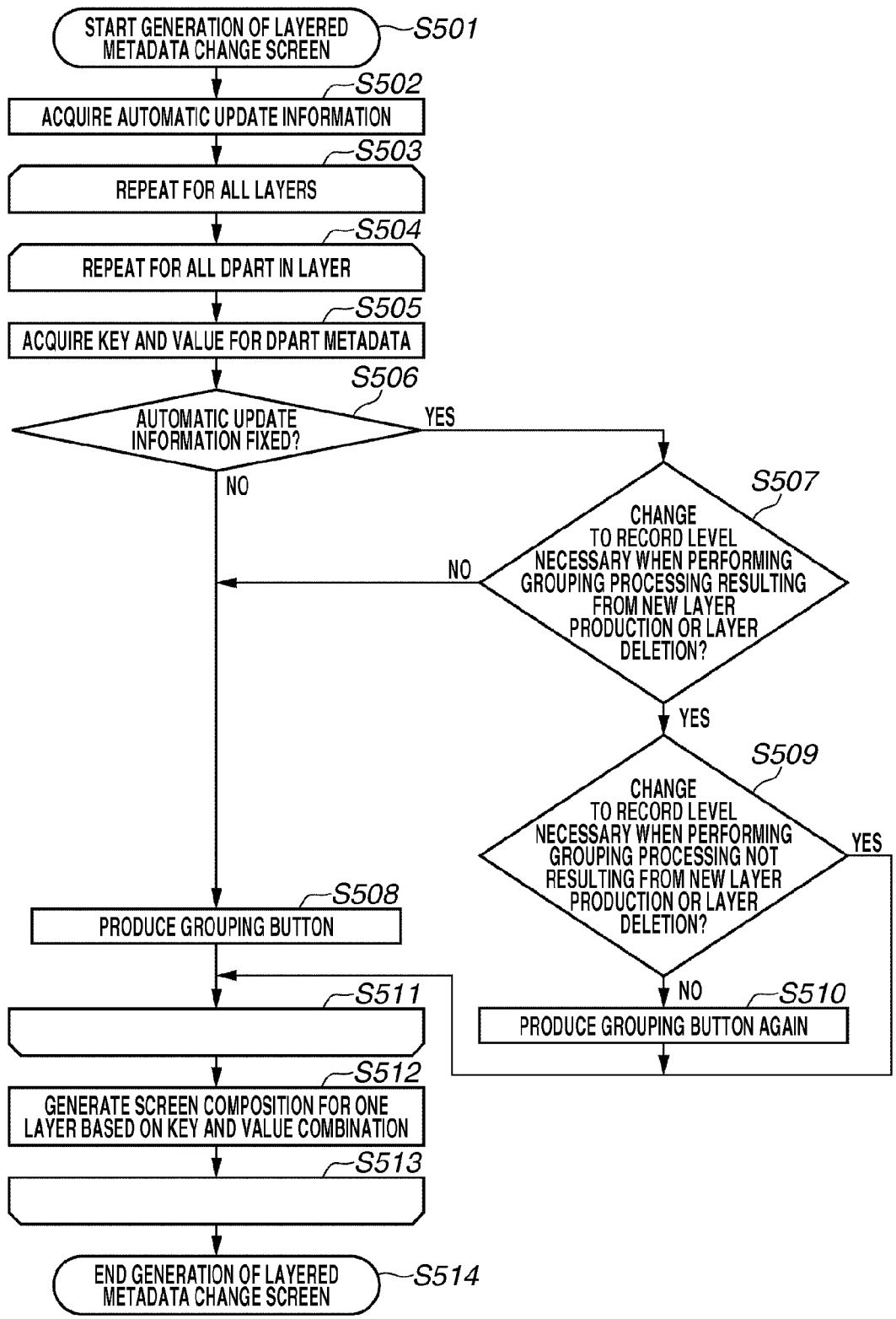
FIG. 15 is a flowchart relating to generation of a layered metadata change screen.

FIG. 15 is a flowchart illustrating when the UI control unit 301 in FIG. 3 instructs the layered metadata change unit 305 to generate a layered metadata change screen according to the second exemplary embodiment.

In step S501, the UI control unit 301 starts the processing of this flowchart by instructing the layered metadata change unit 305 to generate a screen for performing grouping or releasing a grouping of the layered metadata 304a. In step S502, the layered metadata change unit 305 acquires the automatic update information 302.

In step S503, the layered metadata change unit 305 repeats the processing of steps S504 to S512 on all of the layers. In step S504, the layered metadata change unit 305 repeats the processing of steps S505 to S510 on all DParts in a layer.

In step S505, the layered metadata change unit 305 acquires a key and a value from the DPart metadata.

In step S506, the layered metadata change unit 305 determines whether the automatic update information 302 is fixed. If it is determined, in step S506, that it is fixed (YES in step S506), the processing proceeds to step S507. If it is determined, in step S506, that it is not fixed (NO in step S506), the processing proceeds to step S508.

In the automatic update determination screen illustrated in FIG. 14, if the check box 1006 is checked, the automatic update information 302 is determined as being fixed, while if the check box 1006 is not checked, the automatic update information 302 is determined as not being fixed.

In step S507, the layered metadata change unit 305 determines whether the record level needs to be changed when performing grouping processing that results in production of a new layer or deletion of a layer for the metadata key acquired in step S505. If it is determined, in step S507, that the record level does not need to be changed (NO in step S507), the processing proceeds to step S508. If it is determined, in step S507, that the record level needs to be changed (YES in step S507), the processing proceeds to step S509.

In step S508, the layered metadata change unit 305 produces the grouping buttons for performing the grouping processing based on the metadata key acquired in step S505. Similar to the grouping buttons 706 and 707, for example, illustrated in FIG. 9, the grouping buttons produced in this step are buttons for receiving a grouping processing instruction that results in production of a new layer or deletion of a layer.

In step S509, the layered metadata change unit 305 determines whether the record level needs to be changed when performing grouping processing that does not result in production of a new layer or deletion of a layer for the metadata key acquired in step S505. In the following description, grouping processing that does not result in production of a new layer or deletion of a layer will be referred to as "re-grouping processing". A specific example of re-grouping will be described below referring to FIG. 16.

In step S509, if it is determined that the record level does not need to be changed even if re-grouping processing is performed (NO in step S509), the processing proceeds to step S510. If it is determined, in step S509, that the record level needs to be changed if re-grouping processing is performed (YES in step S509), it is determined that the target metadata key cannot be grouped without changing the record level, and the processing proceeds to step S511 without buttons being produced.

In steps S508 and S509, the layered metadata change unit 305 determines whether the record level needs to be changed by determining whether the layer in which the metadata key selected on the automatic update determination screen is present is changed from the previous layer. If the layer in which the metadata key selected on the automatic update determination screen is present is changed from the previous layer due to group processing, the layered metadata change unit 305 determines that the record level needs to be changed.

If the layer in which the metadata key selected on the automatic update determination screen is present is not changed from the previous layer due to grouping processing, the layered metadata change unit 305 determines that the record level does not need to be changed.

In step S510, the layered metadata change unit 305 produces the re-grouping buttons for performing re-grouping processing based on the metadata key acquired in step S505. In step S511, the layered metadata change unit 305 performs the processing of steps S505 to S510 on all of the DParts in the layer, and then the processing proceeds to step S512.

In step S512, the layered metadata change unit 305 generates a screen composition for one layer from a combination of the key and the value obtained in step S505 and the buttons produced in steps S508 or S510. In step S513, the layered metadata change unit 305 performs the processing of steps S504 to S512 on all of the layers. Then, the processing proceeds to step S514, and the processing of this flowchart is finished.

FIG. 16 illustrates a layered metadata change screen obtained based on the processing executed in the flowchart of FIG. 15 for the layered metadata 304a of FIG. 11A and the automatic update information 302 in which "name" and "fixed" were selected on the automatic update determination screen of FIG. 14.

Region 1101 is an operation UI display region for performing a new grouping or releasing a grouping. In step S509 of FIG. 15, the "prefecture" key of FIG. 9D cannot be grouped unless the layer is released, and if it is grouped, the layer to be repeatedly processed will change. Therefore, buttons are not displayed in the operation UI display region 1101.

Region 1102 is an operation UI display region for performing a new grouping or releasing a grouping. In step S509 of FIG. 15, the "name" key of FIG. 9D cannot be grouped unless a layer is produced. Further, in step S509 of FIG. 15, even if the "name" key is re-grouped by moving it from the second layer to the first layer, the layer to be repeatedly processed will change. Therefore, buttons are not displayed in the operation UI display region 1102.

Region 1103 is a button display region for grouping based on the "city" key. In step S509 of FIG. 15, for the "city" key, unless the re-grouping is performed without producing a layer in a higher hierarchy, there is no change in the layer to be repeatedly processed. Therefore, a re-grouping button is displayed for the higher hierarchy.

For the lower hierarchy layers, in step S507 of FIG. 15, there is no change in the layer to be repeatedly processed even if the "city" key of FIG. 9D is grouped by producing a layer. Therefore, a grouping button is displayed. Further, regions 1104 and 1105 are button display regions for grouping based on the "gender" key and the "age" key. The same grouping buttons and re-grouping buttons are displayed as for the "city" key buttons.

The processing performed when a re-grouping button is pressed will now be described. In re-grouping processing, grouping with the layer adjacent to the layer including the key whose re-grouping button is pressed is performed without producing a new layer or deleting a layer.

For example, when the re-grouping button included in the region 1103 in FIG. 16 is pressed, the "city" key is also included in the layer including the "prefecture" key, so that the "city" key is grouped. Therefore, a layer for the "city" key is not newly produced.

Thus, on the automatic update determination screen, if "fixed" is selected, grouping can be performed within a range in which the layer to be repeatedly processed does not change. In this case, if performing grouping, whether buttons are displayed or not is controlled based on whether the layer to be repeatedly processed changes.

As described above, the layered metadata can be edited within a range in which the printing control information 306 referring to the layered metadata does not have to be updated. Therefore, the overall consistency can be guaranteed.

In the first exemplary embodiment according to the present invention, a method for automatically updating the printing control information 306 is described in which a metadata key is specified in advance, so that the layer to which the pre-specified key belongs is set as the layer to be repeatedly processed after the hierarchical structure is edited.

However, sometimes it may be difficult to specify in advance. Therefore, in the present exemplary embodiment, an example will be described in which consideration is given to updating the printing control information after editing of the hierarchical structure has been completed. In the description of the present exemplary embodiment, portions which duplicate the above exemplary embodiments will be omitted.

Figure 17:
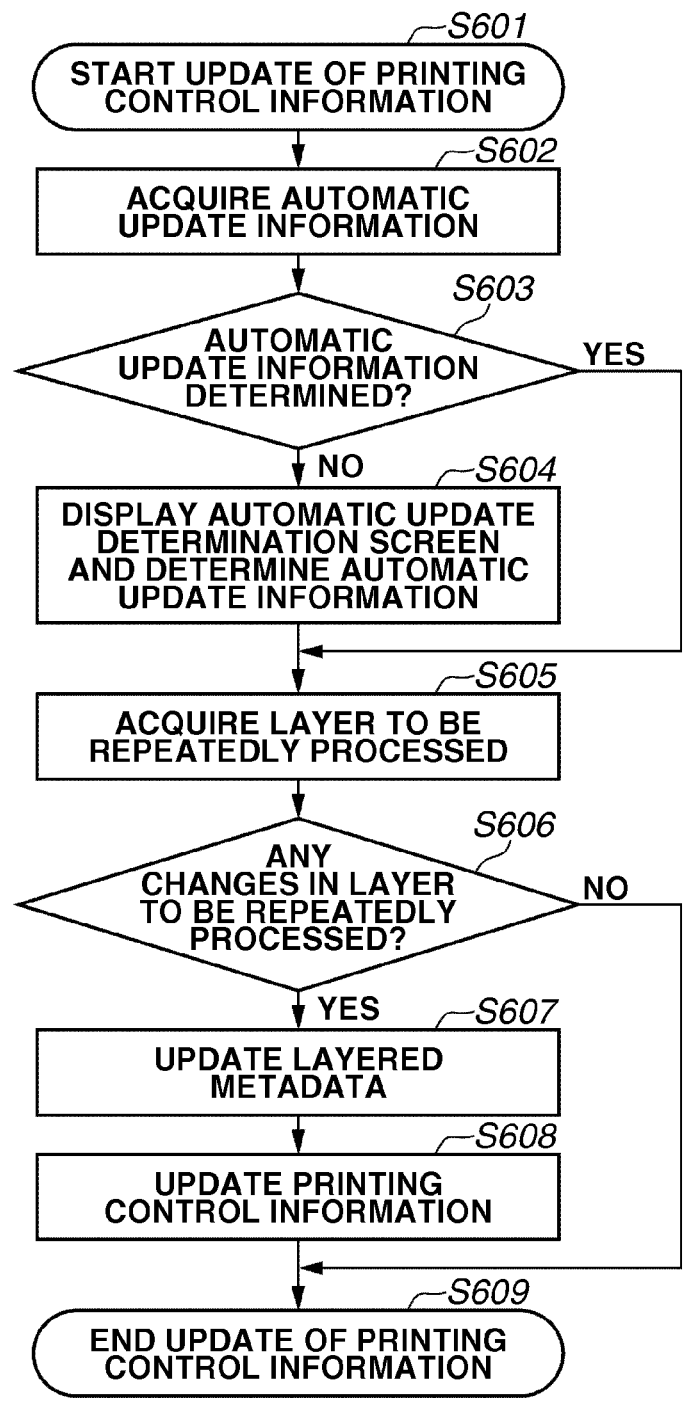
FIG. 17 is a flowchart relating to update of printing control information.

FIG. 17 is a flowchart illustrating when editing is performed on the layered metadata change screen to confirm the layered metadata 304*a*, and the UI control unit 301 illustrated in FIG. 3 instructs the printing control information update unit 307 to update the printing control information.

In step S601, the UI control unit 301 starts the processing of this flowchart by instructing the printing control information update unit 307 to update the printing control information. In step S602, the printing control information update unit 307 acquires the automatic update information 302.

In step S603, the printing control information update unit 307 determines whether the automatic update information has been determined. If it is determined, in step S603, that the automatic update information has been determined (YES in step S603), the processing proceeds to step S605. If it is determined, in step S603, that the automatic update information has not been determined (NO in step S603), the processing proceeds to step S604.

In step S604, the printing control information update unit 307 displays the automatic update determination screen, waits for the automatic update information 302 to be determined by a user operation, and acquires the determined automatic update information 302. When the automatic update information 302 is acquired, the processing proceeds to step S605.

In step S605, the printing control information update unit 307 acquires the record level from the automatic update information 302.

In step S606, the printing control information update unit 307 determines whether there are any changes in the record level. If it is determined, in step S606, that there is a change in the record level (YES in step S606), the processing proceeds to step S607. If it is determined, in step S606, that there are no changes in the record level (NO in step S606), the processing proceeds to step S609, and the processing of this flowchart is finished.

In step S607, the printing control information update unit 307 updates the layered metadata. Further, if there is a key and value pair that is not referred to from the printing control information 306, the printing control information update unit 307 deletes the non-referred metadata.

In step S608, the printing control information update unit 307 updates the printing control information 306. Once the processing for updating the printing control information 306 has been performed in step S608, the processing proceeds to step S609, and the processing of this flowchart is finished.

FIG. 18 is an image diagram illustrating an example of the automatic update determination screen that is displayed in step S604 of FIG. 17. Since the respective check boxes 1201 to 1205 are the same as the check boxes 601 to 605 in FIG. 7, a description thereof will be omitted here. Here, a delete unnecessary metadata check box 1206 will be described.

The delete unnecessary metadata check box 1206 is a check box for specifying whether to delete metadata that has not been referred to from the printing control information 306. If the check box 1206 is checked, this indicates that when metadata that is not referred to from the printing control information 306 is present, that metadata is to be deleted.

In FIG. 18, the "name" 1203 check box and the delete unnecessary metadata check box 1206 are selected, and the key "name" is the layer to be repeatedly processed. Therefore, it is indicated that in step S607, if there is an unnecessary key and value pair that is not referred to from the printing control information 306, that unnecessary metadata is to be deleted from the layered metadata 304*a*.

As described above, the automatic update information 302 can be confirmed last, and the layered metadata can be edited without confirming the layer to be repeatedly processed in advance. Further, consistency with the printing control information 306 can also be ensured.

In the first exemplary embodiment according to the present invention, a method is described in which a metadata key is present in advance, and in which grouping is performed using that key. However, when performing grouping, sometimes the user may wish to redefine the metadata keys. Therefore, in the present exemplary embodiment, an example will be described in which grouping is performed by newly defining a key, rather than using the metadata keys as is.

FIG. 19A illustrates an example of a layered metadata change screen according to the present exemplary embodiment. Key 1301 represents metadata keys including "name", "address", "gender", and "age". Value 1302 represents metadata values, such as "Ichiro Suzuki", "Saburo Tanaka", "Taro Yamada", and "Jiro Sato" for the "name" key. This is similar for the "address", "gender", and "age" keys too.

Grouping buttons 1303 to 1310 are used to perform grouping based on each of the metadata keys. For example, button 1305 can perform grouping based on the "address" key. However, since the values for the "address" key are different from each other, in actual fact grouping is not performed.

Regions 1311 to 1313 are operation regions for newly adding a metadata key. When an arrow key is pressed, a new key definition screen is displayed. The new key definition screen will be described below referring to FIG. 19B. Although the "address" key includes information about a prefecture level and a city level, in FIG. 19A this information is not defined individually as a key. Consequently, grouping can be performed by defining a new key using the new key definition screen.

FIG. 19B is an image diagram illustrating an example of a new key definition screen displayed when the button 1312 in FIG. 19A is pressed. Screen 1314 is a new key definition screen that can be used to define a key and a rule.

Section 1315 is a text input section for inputting a key to be added. In FIG. 19B, an example of adding the "prefecture" key is illustrated as a specific example. Section 1316 is used to describe the conditions for sorting the values for the newly added key. For example, for the prefecture example, a rule can be written in such a manner that the value for the "address" is split after the third letter of the prefecture.

In the case of an address, a grouping such as Tohoku, Kanto, and Tokai, can be separately defined by defining the region. Similarly, for "name", a grouping based on the first letter, such as letter A, letter B, and letter C, can be separately defined by defining the "first letter". In addition, for "age", a rule based on an age range, such as "twenties" and "thirties", can be written by defining the "generation".

FIG. 19C is an image diagram illustrating an example of a layered metadata change screen after the "prefecture" key has been added by the new key definition screen 1314 of FIG. 19B. A region 1317 is an operation region for newly adding a metadata key. In the operation region 1317, "prefecture", which is the key to be newly added in FIG. 19B, is displayed. Button 1318 is a grouping button relating to the "address" key. By pressing the grouping button 1319 while "prefecture" is displayed in the operation region 1317, "prefecture" key grouping processing is performed.

FIG. 19D is an image diagram illustrating an example of a layered metadata change screen after the new group has been produced when the grouping button 1318 was pressed in FIG. 19C. Section 1319 indicates that the "prefecture" key is present as a new group, and that "Tokyo" and "Kanagawa" can be grouped. In FIG. 19D, although the values relating to the "address" key are split, the values may also be produced by copying only the character string corresponding to the "prefecture" key.

Thus, as described above, grouping can be performed by newly defining a key rather than using the metadata keys as is.

Although exemplary embodiments according to the present invention are described above using specific examples, the present invention is not limited to the above-described exemplary embodiments.

Further, the present invention can also be realized by supplying software (a program) for realizing the functions of the above exemplary embodiments to a system or an apparatus via a network or via various storage media, and having a computer (or a central processing unit (CPU) or a micro processing unit (MPU)) of the system or apparatus read and execute the program. In this case, this program and the recording medium on which the program is recorded constitute the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-005834 filed Jan. 14, 2010, which is hereby incorporated by reference herein in its entirety.

What is claimed is:

1. An information processing apparatus for processing print data having a hierarchical structure, in which metadata can be added to layers in the hierarchical structure, the information processing apparatus comprising:
   a storage unit configured to store update information indicating a record level, which is a layer to be repeatedly processed among the layers included in the print data;
   a first acquisition unit configured to acquire a key included in metadata in the print data and a value corresponding to the key;
   a change screen generation unit configured to generate a change screen that can receive an instruction relating to grouping processing of the metadata using the key and the value acquired by the first acquisition unit;
   a processing unit configured to perform grouping processing on the metadata based on the instruction relating to grouping processing received via the change screen;
   a determination unit configured to determine whether the layer for the record level indicated by the update information has been changed to a different layer by the grouping processing performed by the processing unit; and
   a change unit configured to change the record level from the layer to the different layer based on the update information when it is determined by the determination unit that the layer for the record level indicated by the update information has been changed.

2. The information processing apparatus according to claim 1, further comprising:
   a second acquisition unit configured to acquire a key included in metadata in the record level; and
   an update determination screen generation unit configured to generate an update determination screen that can receive an instruction relating to the update processing using the key included in the metadata of the record level acquired by the second acquisition unit,
   wherein the storage unit is configured to store the update information based on an instruction specifying the update information received via the update determination screen.

3. The information processing apparatus according to claim 1, wherein the storage unit is configured to store a key to be included in the record level metadata as the update information, and
   wherein the determination unit is configured to determine that the record level needs to be changed by the grouping processing when the key to be included in the metadata of the record level has moved from the record level layer.

4. The information processing apparatus according to claim 3, wherein the change unit is configured to set the layer in which the key to be included in the metadata of the record level is present as the record level.

5. The information processing apparatus according to claim 1, wherein the change screen generation unit is configured to generate a change screen that, for a key in which the record level does not have to be changed even if grouping processing is executed that results in production of a new layer or deletion of a layer, can receive an instruction for grouping processing that results in production of the new layer or deletion of the layer, and for a key in which the record level has to be changed if grouping processing is executed that results in production of a new layer or deletion of a layer, and in which the record level does not have to be changed even if grouping processing is executed that does not result in production of a new layer and deletion of a layer, can receive an instruction for grouping processing that does not result in production of the new layer or deletion of the layer.

6. A method for controlling an information processing apparatus which processes print data having a hierarchical structure, in which metadata can be added to layers in the hierarchical structure, the method comprising:
   storing update information indicating a record level, which is a layer to be repeatedly processed among the layers included in the print data;
   acquiring a key included in metadata in the print data and a value corresponding to the key;
   generating a change screen that can receive an instruction relating to grouping processing of the metadata using the acquired key and the value;

performing grouping processing on the metadata based on the instruction relating to grouping processing received via the change screen;

determining whether the layer for the record level indicated by the update information has been changed to a different layer due to the grouping processing; and changing the record level from the layer to the different layer based on the update information when it is determined that the layer for the record level indicated by the update information has been changed.

7. The method for controlling an information processing apparatus according to claim 6, further comprising:

acquiring a key included in the record level metadata; and generating an update determination screen that can receive an instruction relating to the update processing using the acquired key included in the record level metadata, wherein the update information is stored based on an instruction specifying the update information received via the update determination screen.

8. The method for controlling an information processing apparatus according to claim 6, wherein a key to be included in the record level metadata is stored as the update information, and wherein it is determined that the record level needs to be changed due to the grouping processing when the key to be included in the metadata in the record level has moved from the record level layer.

9. The method for controlling an information processing apparatus according to claim 8, wherein the layer in which the key to be included in the record level metadata is present is set as the record level.

10. The method for controlling an information processing apparatus according to claim 6, wherein a change screen is generated that, for a key in which the record level does not have to be changed even if grouping processing is executed that results in production of a new layer or deletion of a layer, can receive an instruction for grouping processing that results in production of the new layer or deletion of the layer, and for a key in which the record level has to be changed if grouping processing is executed that results in production of a new layer or deletion of a layer, and in which the record level does not have to be changed even if grouping processing is executed that does not result in production of a new layer and deletion of a layer, can receive an instruction for grouping processing that does not result in production of the new layer or deletion of the layer.

11. A non-transitory computer-readable storage medium that stores a program which causes a computer to execute the method for controlling an information processing apparatus according to claim 6.

* * * * *